US007159042B1

(12) United States Patent
Morvan et al.

(10) Patent No.: US 7,159,042 B1
(45) Date of Patent: Jan. 2, 2007

(54) METHOD AND DEVICE FOR COMMUNICATING A MESSAGE ON A NETWORK AND SYSTEMS USING THEM

(75) Inventors: Isabelle Morvan, Rennes (FR); Alain Caillerie, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/515,872

(22) Filed: Feb. 29, 2000

(30) Foreign Application Priority Data

| Mar. 4, 1999 | (FR) | ................................ 99 02700 |
| Mar. 4, 1999 | (FR) | ................................ 99 02701 |
| Mar. 10, 1999 | (FR) | ................................ 99 02954 |

(51) Int. Cl.
*G06F 15/173* (2006.01)
*G06F 15/16* (2006.01)
*H04B 7/212* (2006.01)

(52) U.S. Cl. .................. 709/248; 709/238; 370/324; 370/331

(58) Field of Classification Search ................ 709/220, 709/221, 222; 370/331, 338, 436; 455/11.1, 455/450

See application file for complete search history.

(56) References Cited

U.S. PATENT DOCUMENTS

| 5,267,261 | A | * | 11/1993 | Blakeney et al. ........... 370/332 |
| 5,515,509 | A | | 5/1996 | Rom ....................... 395/200.1 |
| 5,974,236 | A | * | 10/1999 | Sherman ..................... 709/221 |
| 5,991,287 | A | * | 11/1999 | Diepstraten et al. ........ 370/338 |
| 6,047,178 | A | * | 4/2000 | Frlan .......................... 455/450 |
| 6,078,609 | A | * | 6/2000 | Nago .......................... 370/436 |
| 6,101,175 | A | * | 8/2000 | Schorman et al. .......... 370/331 |
| 6,307,840 | B1 | * | 10/2001 | Wheatley et al. ........... 370/252 |
| 6,377,549 | B1 | * | 4/2002 | Ngo et al. ................... 370/233 |
| 6,574,452 | B1 | * | 6/2003 | Morvan et al. ............. 455/11.1 |
| 6,721,305 | B1 | * | 4/2004 | Chan et al. ................. 455/11.1 |
| 6,894,992 | B1 | * | 5/2005 | Morvan et al. ............. 370/329 |
| 2001/0036810 | A1 | * | 11/2001 | Larsen ....................... 455/11.1 |
| 2002/0086682 | A1 | * | 7/2002 | Naghian ..................... 455/456 |

FOREIGN PATENT DOCUMENTS

| DE | 197 04 907 | 7/1997 |
| EP | 0 497 490 | 8/1992 |
| EP | 0 689 303 | 5/1994 |
| EP | 0 732 817 | 9/1996 |
| GB | 2279849 | 1/1995 |
| WO | WO 94/05101 | 3/1994 |

OTHER PUBLICATIONS

"Bluetooth—The universal radio interface for ad hoc, wireless connectivity", Hartsen, Ericsson Review, No. 3, 1998, pp. 110-117.

* cited by examiner

*Primary Examiner*—Patrice Winder
(74) *Attorney, Agent, or Firm*—Fitzpatrick, Cella, Harper & Scinto

(57) ABSTRACT

The communication method concerns communication stations adapted to communicate with each other when a base station supplies a synchronisation signal to mobile stations synchronising on this signal.

This method includes a request operation during which a first base station transmits, to a mobile station, a request for the storage in memory and transmission, by the mobile station, of a message, to a message destination communication station which is not synchronised with the first base station.

4 Claims, 32 Drawing Sheets

| 300 | Mode | Base |
|-----|------|------|
| 301 | PP | 300 |
| 302 | PP | 303 |
| 303 | FP | 300 |

Fig. 4b

| 300 | Mode | Base |
|-----|------|------|
| 301 | PP | 300 |
| 302 | PP | 300 |
| 303 | PP | 300 |

Fig. 4a

| 1601 | Mode | Base |
|------|------|------|
| 1604 | PP   | 1603 |
| 1603 | FP   | 1601 |

Fig. 17b

| 1601 | Mode | Base |
|------|------|------|
| 1604 | PP   | 1601 |
| 1603 | PP   | 1601 |

Fig. 17a

METHOD AND DEVICE FOR COMMUNICATING A MESSAGE ON A NETWORK AND SYSTEMS USING THEM

BACKGROUND OF THE INVENTION

The present invention concerns a method and device for communicating on a network and systems using them. It applies in particular to local wireless networks with centralised architecture, for which each communication is organised between a so-called base communication station, also referred to as the "fixed part", and a mobile communication station, also referred to as the "portable part".

An example of such a communication network is given by the telephones using the DECT (Digital Enhanced Cordless Telecommunications) European standard.

In such a local network, a base station supplies a synchronisation signal to all the mobile stations present in a cell of the network. All the stations (the base station and one or more mobile stations) which are thus synchronised with each other constitute a cell.

In such a network, there is no communication channel between the cells, nor any synchronisation, and the stations of two different cells can therefore not communicate with each other.

The document EP 732 817 is known, which describes a procedure for synchronising adjacent DECT radio cells. This procedure must be performed regularly (for example every second), which consumes power. This can be a problem for stations powered by a battery.

The document U.S. Pat. No. 5,515,509 is also known, which describes a method for setting up a communication link between adjacent cells in a wireless network. This method uses a control communication channel and equipment which has a relay function. This relay function is permanent and requires dedicated equipment, which is not very flexible, since the relay equipment then loses its mobility.

BRIEF SUMMARY OF THE INVENTION

The present invention sets out to remedy these drawbacks and, in particular, to make it possible to transmit short messages between two cells situated in the same local area and which are not synchronised. This invention supplies a temporary gateway function which can be used for:

notifying a call external to the cell, notifying the reception of a fax, notifying the reception of an electronic mail message, notifying the status of a station and, in particular, a status concerning the base station (air interface busy or free, etc).

To this end, the present invention relates, according to a first aspect, to a method of communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that it includes a request operation during which a first base station transmits, to a mobile station, a request for the storage in memory and transmission, by said mobile station, of a message, to a communication station for which the message is intended and which is not synchronised with said first base station.

The present invention relates, according to a second aspect, to a method of communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that it includes:

a first operation of receiving a message, during which a mobile station synchronised with a first base station receives a message coming from said first base station, an operation of detachment and attachment, during which said mobile station synchronises with a second base station, without the two base stations synchronising with each other, and a second transmission operation, during which said mobile station transmits said message to said second base station.

By virtue of these provisions, a communication gateway can be established temporarily between two non-synchronised cells. In addition, it is not necessary to regularly synchronise two cells nor to fix the status of a communication station as a relay station. Quite the contrary, the communication link between two non-synchronised cells is set up solely when a message is to be transmitted from one cell to the other. In addition, it is not necessary to have equipment dedicated to the role of relay in the system in order to be able to communicate between two non-synchronised cells. The relay role for a mobile station is temporary and dynamic, and each mobile station in the system can become a relay at a given moment according to its availability.

In addition, implementing the invention is easy and, for the user, transparent.

According to particular characteristics, the method of the invention as succinctly disclosed above also includes a response operation during which said mobile station transmits to said first base station a message of acceptance or refusal of transmission of said message to the message destination station.

By virtue of these provisions, it is the mobile station which decides whether or not it agrees to serve as a messenger. These characteristics enable it to take account of current or future communications in which it is a party, a service quality to be provided to its user, its energy resources, etc.

According to particular characteristics of the method which is the object of the present invention as succinctly disclosed above, as a preliminary to said request operation, the first base station performs an operation of selecting, from a so-called "location" table, the mobile station which is the destination of the request to store in memory and transmit.

Preferentially, if, during the response operation, the mobile station transmits, to the first base station, a message refusing transmission of said message, the base station performs a new operation of selecting, from a so-called "location" table, a mobile station which is the destination of the request to store in memory and transmit.

By virtue of each of these provisions, the allocation of the role of station which conveys the message between the two cells is not fixed in advance but by a dynamic selection, which makes it possible to take account of the current or future traffic, a service quality to be provided, available energy resources, etc.

According to particular characteristics of the present invention as succinctly disclosed above, during the request operation, the first base station transmits to the mobile station:

the content of the message to be transmitted to the message destination station, an identifier of the message destination station, an identifier of the first base station, and/or an identifier of a source station which supplies, to the first base station, the message to be transmitted to the message destination station.

By virtue of all these provisions, a single transmission from the first base station suffices for the mobile station which serves as a relay and the message destination station to be able to receive and transmit the message and reply to the first base station.

According to particular characteristics of the present invention as succinctly disclosed above, said message represents a traffic between the mobile stations synchronised on the first base station and the first base station.

By virtue of these provisions, the traffic of the cell whose base station is the first base station can be known from the second base station and:

the traffic of the two cells can then be balanced by transferring one or more communications from one base station to the other, or when the traffic is very low for each base station, the two cells can be merged, one of the base stations then switching into mobile station operating mode and synchronising, along with all the mobile stations which were synchronised with it, with the remaining base station.

According to a third aspect, the present invention relates to a device for communication between communication stations adapted to communicate with each other when at least one of said communication stations supplies a synchronisation signal, said station then functioning in "base station" mode and the stations not supplying a synchronisation signal but synchronising on a synchronisation signal transmitted by a station functioning in base station mode then functioning in "mobile station" mode, characterized in that it has, in a first base station, a request means adapted to transmit, to a mobile station, a request for the storage in memory and transmission, by said mobile station, of a message, to a message destination communication station which is not synchronised with said first base station.

According to a fourth aspect, the present invention relates to a device for communication between communication stations adapted to communicate with each other when at least one of said communication stations supplies a synchronisation signal, said station then functioning in "mobile station" mode and the stations not supplying a synchronisation signal but synchronising on a synchronisation signal transmitted by a station functioning in base station mode then functioning in "mobile station" mode, characterized in that it has:

in a mobile station synchronised with a first base station, a first means of receiving a message, adapted to receive a message coming from said base station, a detachment and attachment means adapted to synchronise said mobile station with a second base station, without the two base stations synchronising with each other, the transmission means also being adapted to transmit said message to said second base station when said mobile station is synchronised with said second base station.

The invention also relates to a network, a computer, a camera, a facsimile machine, a photographic apparatus, a television receiver, a printer, a scanner and an audio/video player, characterized in that they have a device according to the third and/or fourth aspects of the invention as succinctly disclosed above.

The invention also relates to:

an information storage means which can be read by a computer or a microprocessor storing instructions of a computer program characterized in that it makes it possible to implement the method according to the first and/or second aspects of the invention as succinctly disclosed above, and an information storage means which is removable, partially or totally, and which can be read by a computer or a microprocessor storing instructions of a computer program characterized in that it makes it possible to implement the method according to the first and/or second aspects of the invention as succinctly disclosed above.

The invention also relates to a computer program product comprising software code portions for implementing a method according to the first and/or second aspects of the invention as succinctly disclosed above.

The preferential or particular characteristics, and the advantages of this device, of this computer, of this camera, of this facsimile machine, of this photographic apparatus, of this television receiver, of this printer, of this scanner, of this audio/video player, of these information storage means and of this computer program product being identical to those of the method according to the first and second aspects of the invention as succinctly disclosed above, these advantages are not repeated here.

The present invention also relates, according to a fifth aspect, to a method of communicating between communication stations adapted to communicate with each other when at least one of said communication stations supplies a synchronisation signal, said station then functioning in "base station" mode, and the stations not supplying a synchronisation signal but synchronising on a synchronisation signal transmitted by a station functioning in base station mode then functioning in "mobile station" mode, wherein, for at least one communication to be effected between a so-called "source" station and a so-called "destination" station which is not synchronised with said source station, said source station performs:

an operation of synchronisation with:

a base station with which said destination station is synchronised when the destination station is functioning in mobile station mode, or with the destination station if it is functioning in base station mode, and an operation of communicating with the destination station.

According to a sixth aspect, the present invention relates to a method of communicating between communication stations adapted to communicate with each other when at least one of said communication stations supplies a synchronisation signal, said station then functioning in "base station" mode, and the stations not supplying a synchronisation signal but synchronising on a synchronisation signal transmitted by a station functioning in base station mode then functioning in "mobile station" mode, wherein, for at least one communication to be effected between a so-called "source" station and a so-called "destination" station, said destination station performs:

an operation of receiving a message coming from the source station functioning in mobile station mode, an operation of synchronising with the source station functioning in base station mode, and an operation of communicating with the source station functioning in base station mode.

Thus, when a source station has a message to transmit to another, destination, station, with which it is not synchronised, it synchronises first of all with a destination station, possibly by means of a base station with which the destination station is synchronised, and then communicates the message in question to the destination station.

By virtue of these provisions, it is not necessary to regularly synchronise two cells nor to fix the status of a communication station as a relay station. Quite the contrary, the communication link between two non-synchronised cells is set up solely when a message is to be transmitted from one cell to the other.

In addition, the implementation of the present invention is easy and, for the user, transparent. It enables the destination station to receive a message from a source external to the cell (for example with a view to taking an external call without any configuration on the part of a user.

The implementation of the present invention thus makes it possible to resolve one of the problems of distributed communications: the break in the communication link with the outside world, that is to say the fact that the stations in a cell cannot receive a message from stations external to this cell.

According to particular characteristics of the method of the invention as succinctly disclosed above, following the communication operation, the destination station performs a detachment and attachment operation during which the destination station synchronises with the source station, if the latter is functioning in base station mode, and, otherwise, with a base station with which the source station is synchronised.

By virtue of these provisions, when the source station is connected to an external network, the destination station can enter into communication with this external network.

According to a seventh aspect, the present invention relates to a device for communicating between communication stations adapted to communicate with each other when at least one of said communication stations supplies a synchronisation signal, said station then functioning in "base station" mode, and the stations not supplying a synchronisation signal but synchronising on a synchronisation signal transmitted by a station functioning in base station mode then functioning in "mobile station" mode, characterized in that it has, for at least one communication to be effected between a so-called "source" station and a so-called "destination" station which is not synchronised with said source station, in said source station:

a synchronisation means adapted to synchronise said source station with:

a base station with which said destination station is synchronised if the destination station is functioning in mobile station mode, or the destination station if it is functioning in base station mode, and a communication means adapted to communicate with the destination station.

According to an eighth aspect, the present invention relates to a device for communicating between communication stations adapted to communicate with each other when at least one of said communication stations supplies a synchronisation signal, said station then functioning in "base station" mode, and the stations not supplying a synchronisation signal but synchronising on a synchronisation signal transmitted by a station functioning in base station mode then functioning in "mobile station" mode, characterized in that it has, for at least one communication to be effected between a so-called "source" station and a so-called "destination" station, in said destination station:

a means of receiving a message coming from the source station functioning in mobile station mode, a means of synchronising with the source station functioning in base station mode, and a means of communicating with the source station functioning in base station mode.

The invention also relates to a network, a computer, a camera, a facsimile machine, a photographic apparatus, a television receiver, a printer, a scanner and an audio/video player, characterized in that they have a device according to the seventh and/or eighth aspects of the invention as succinctly disclosed above.

The invention also relates to:

an information storage means which can be read by a computer or a microprocessor storing instructions of a computer program characterized in that it makes it possible to implement the method according to the fifth and/or sixth aspects of the invention as succinctly disclosed above, and an information storage means which is removable, partially or totally, and which can be read by a computer or a microprocessor storing instructions of a computer program characterized in that it makes it possible to implement the method according to the fifth and/or sixth aspects of the invention as succinctly disclosed above.

The invention also relates to a computer program product comprising software code portions for implementing a method according to the fifth and/or sixth aspects of the invention as succinctly disclosed above.

The preferential or particular characteristics, and the advantages of these devices, of this computer, of this camera, of this facsimile machine, of this photographic apparatus, of this television receiver, of this printer, of this scanner, of this audio/video player, of these information storage means and of this computer program product being identical to those of the method according to the fifth and/or sixth aspects of the invention as succinctly disclosed above, these advantages are not repeated here.

The communication protocol according to the DECT standard enables subcells to be created, in a temporary fashion, for example during the period of a communication requiring a large passband. In this case, when the so-called principal cell has created a first communication subcell, that is to say when several stations of the principal cell are synchronised with each other, and the first subcell has created a second subcell, the principal cell has, at the present time, no means of guaranteeing the delivery of a message to the second subcell.

This is because the principal cell is completely ignorant of the existence of this second subcell.

The document U.S. Pat. No. 5,802,473 (Nortel) is known, which describes a method for determining, in an automatic process, the current topology of a cellular system. This method is based on the measurement of a received signal strength indicator (RSSI) between base stations in order to supply an initial topology of the system and to determine which cell has the greatest probability of supporting a link with a portable user (a portable station). The data are based on a static configuration of the base stations, which are all synchronised with each other, and are managed by a single central system. This method cannot therefore be adapted to distributed communications, to their non-synchronised characteristic and to their dynamic change.

The document U.S. Pat. No. 4,644,532 (IBM) is also known, which concerns a method for keeping up to date a topology data base in a network having at least one control node. A control node according to this document can be compared with a base station in accordance with the DECT standard. However, with the method proposed by this document, each time there is a change to the network, a broadcast is made to inform all the nodes in the system. This procedure unnecessarily takes up radio passband.

The present invention sets out to remedy these drawbacks and, in particular, to allow the transmission of a message representing the location of a particular station.

In particular, the message enables:

a base station to be informed, when necessary, of the reorganisation of a distributed communication environment;

a base station of a first subcell to inform the base station of the principal cell, when necessary, of the existence of a second subcell of the first subcell; and/or a base station of a first subcell to inform the base station of a second subcell of the first subcell of the disappearance of the first subcell.

To this end, the present invention relates, according to a ninth aspect, to a method of communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that a first station of a first cell performs:

an operation of determining a need for information on a second station, concerning a cell in which at least one so-called "third" station is situated, and when such information is necessary, an operation of transmitting, to the second station, a message representing the cell in which at least one third station is situated.

The present invention relates, according to a tenth aspect, to a method of communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that it includes an operation of updating a location table during which said first station stores in memory, associated with another station, an identifier for a station with which said other station is synchronised.

By virtue of these provisions, each station, whether it is situated in the principal cell, in the first cell or in the second cell, can be joined at any time. In addition, the present invention offers complete transparency for the users of the network, of any reorganisation of subcells, and makes it possible to take into account any possible change in the distributed communication system.

Thus the implementation of the present invention minimises the use of radio resources, with a view to transmitting information concerning the location of the stations in the system.

According to a particular characteristic, a third station is merged with the first station.

By virtue of these provisions, a base station which wishes to switch to mobile station operating mode can inform the mobile stations which are synchronised with it of this new situation. The mobile stations informed can thus either resynchronise on another base station, or reform a new cell, switching one of the mobile stations into base station operating mode. This avoids abruptly cutting the communication link between these mobile stations.

According to a particular characteristic, during the operation of determining the necessity for information, said first station determines that information is necessary when:

it is functioning as a base station;

it receives information intended for a station which is not synchronised with it.

By virtue of these provisions, the second station is informed of the location of the third station only when it attempts to contact it, which saves on radio resources and makes it possible to obtain this information dynamically.

According to a particular characteristic, during said transmission operation, the first station transmits, to the second station, a message representing a base station with which the third station was synchronised.

By virtue of these provisions, the second station is capable of locating the third non-synchronised station, and thus to synchronise with the third station in order to transfer a message to it. This message can for example come from a base station connected to a telephone network, which receives a call intended for the third station then non-synchronised with this base station. By virtue of these provisions, it is then possible to correctly locate the third station and to inform it that a call which is intended for it is waiting.

According to a particular characteristic, this communication method includes an operation of updating a location table during which said first station stores in memory, associated with a third station, an identifier for a station with which said third station is synchronised.

By virtue of these provisions, a base station is kept informed of the reorganisation of its subcells, which enables it to correctly route the messages intended for stations belonging to these subcells.

According to a particular characteristic, said first station performs said updating operation when it receives, from a third station, a detachment message identifying a base station with which the third station will synchronise or indicating that the third station will function in base station mode.

According to a particular characteristic, said first station performs said updating operation when it receives, from another first station, a message representing a base station with which said third station is synchronised.

By virtue of these provisions, the updating of the location information is performed dynamically and solely when there is a change in the topology of the system, such as the disappearance of a subcell.

According to a particular characteristic, during the operation of determining the necessity for information, said first station determines that information is necessary when:

the first station is functioning as a base station;

at least one mobile station has been synchronised with said first station and has synchronised with another base station or has switched into base station mode, and the first station switches into mobile station mode.

By virtue of these provisions, the information concerning the location of the subcells generated by the first station then functioning in base station mode can be transferred to another base station when the first station wishes to switch to mobile station operating mode. This makes it possible not to lose the access path to the stations constituting the subcells. The determination of a need for information makes it possible to adapt to a dynamic and rapid reorganisation of the tree of the cells of the DECT local network without consuming too much radio passband.

According to a particular characteristic, during said transmission operation, said first station transmits, to the third station, a message representing a base station with which the first station will synchronise.

By virtue of these provisions, the first station can inform the third station of its future location. Thus, if the third station wishes to remain synchronised with the first station, it can "follow" it.

According to an eleventh aspect, the present invention relates to a device for communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that it has:

means for determining the need to inform a second station, concerning a cell in which at least one so-called "third" station is situated, and transmission means for transmitting, when such information is necessary, to the second station, a message representing the cell in which at least one third station is situated.

According to a twelfth aspect, the present invention relates to a device for communicating between communication stations adapted to communicate with each other when at least one of said communication stations supplies a synchronisation signal, said station then functioning in "base station" mode and the stations not supplying a synchronisation signal but synchronising on a synchronisation signal sent by a station functioning in base station mode then functioning in "mobile station" mode, characterized in that it has location table updating means for storing in memory, associated with another station, an identifier for a station with which said other station is synchronised.

The invention also relates to a network, a computer, a camera, a facsimile machine, a photographic apparatus, a television receiver, a printer, a scanner and an audio/video player, characterized in that they have a device according to the eleventh and/or twelfth aspects of the invention as succinctly disclosed above.

The invention also relates to:

an information storage means which can be read by a computer or a microprocessor storing instructions of a computer program characterized in that it makes it possible to implement the method according to the ninth and/or tenth aspects of the invention as succinctly disclosed above, and an information storage means which is removable, partially or totally, and which can be read by a computer or a microprocessor storing instructions of a computer program characterized in that it makes it possible to implement the method according to the ninth and/or tenth aspects of the invention as succinctly disclosed above.

The invention also relates to a computer program product comprising software code portions for implementing a method according to the ninth and/or tenth aspects of the invention as succinctly disclosed above.

The preferential or particular characteristics, and the advantages of this device, of this computer, of this camera, of this facsimile machine, of this photographic apparatus, of this television receiver, of this printer, of this scanner, of this audio/video player, of these information storage means and of this computer program product being identical to those of the method according to the ninth and/or tenth aspects of the invention as succinctly disclosed above, these advantages are not repeated here.

BRIEF DESCRIPTION OF THE SEVERAL VIEWS OF THE DRAWINGS

Other advantages, aims and characteristics of the present invention will emerge from the following description, given with regard to the accompanying drawings, in which:

FIGS. 4a and 4b depict base station location tables, FIGS. 17a and 17b depict base station location tables.

DETAILED DESCRIPTION OF THE INVENTION

Knowing that so-called "hybrid" communication stations can operate either in base station mode or in mobile station mode, in the remainder of the description the term "base station" will encompass on the one hand the communication stations which can function only according to base station operating mode and on the other hand the hybrid communication stations temporarily functioning in base station mode. Likewise, in the remainder of the description, the term "mobile station" will encompass on the one hand the communication stations which can function only according to mobile station operating mode and one the other hand the hybrid communication stations functioning temporarily in mobile station mode.

In general terms, it will be said that a station is synchronised with a base station either when it functions in mobile station mode and is synchronised with a base station or when it functions itself in base station mode.

Figure 1:
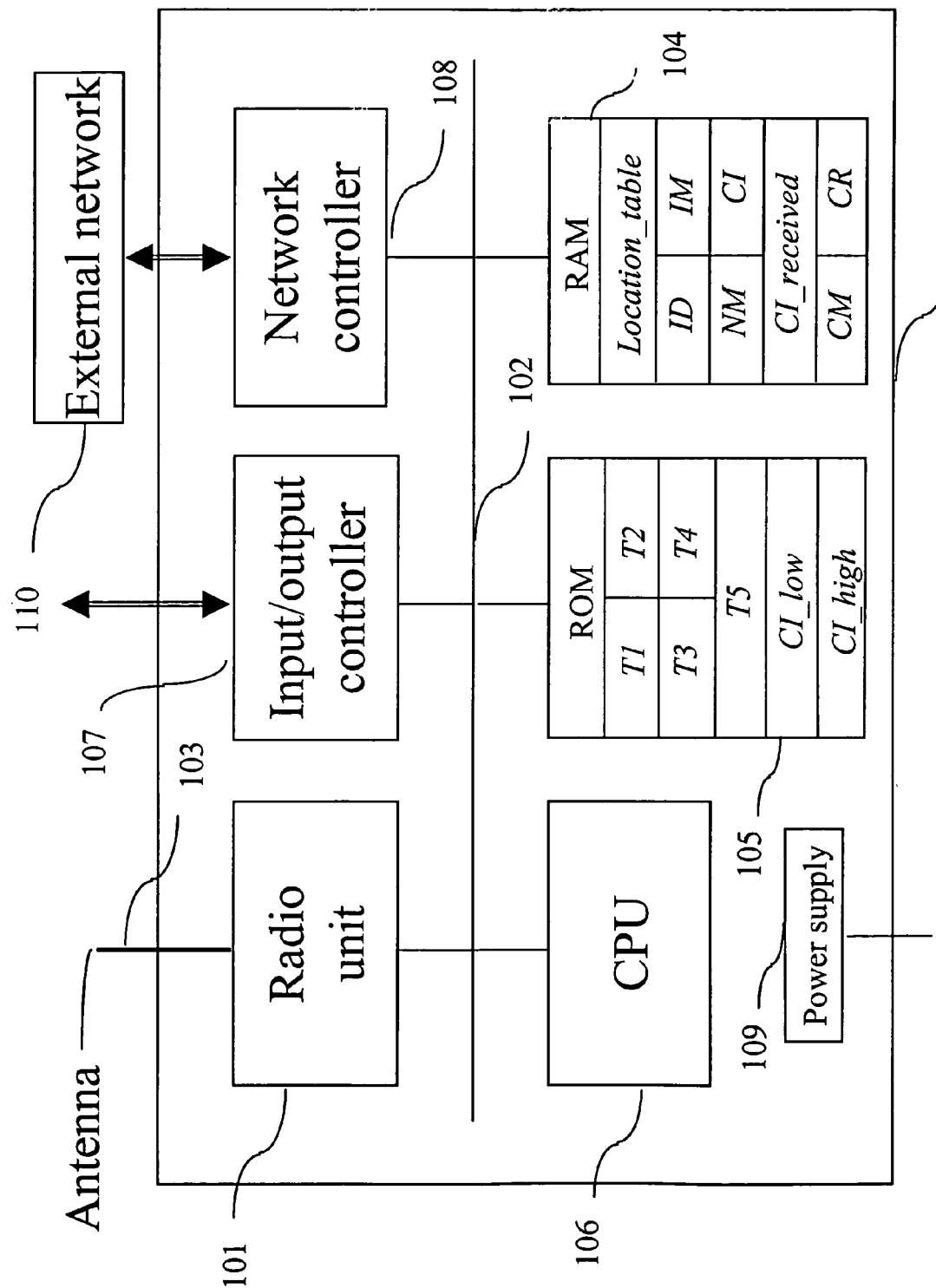
FIG. 1 depicts schematically the architecture of an electronic circuit incorporated in a communication device in accordance with the third and fourth aspects of the present invention and adapted to function in base station mode.

FIG. 1 depicts the electronic circuit of a wireless communication device, using the DECT European standard (specified by the ETSI, ETS 300 175, 1991), which can be connected to a network of the STN (Switched Telecommunication Network), Ethernet etc type.

This device can be either a DECT base station, or a DECT hybrid station. A DECT base station is responsible notably for providing the synchronisation of the system. A hybrid station is a communication station which can alternately operate as a base station or as a mobile station. This communication device can be integrated into equipment of the computer, printer, fax etc type or be connected to one of the above mentioned items of equipment. The electronic circuit 100 includes, connected together by an address and data bus 102:

a radio unit 101, provided with an antenna 103,
an input/output controller 107,
a network controller 108,
a central processing unit 106,
a read only memory ROM 105, and
a random access memory RAM 104.

In addition, an electrical power supply 109 is provided for powering all the components of the electronic circuit 100 (the electrical connections concerning the power supply 109 are not shown).

The network controller 108 manages the interface with an external network 110, for example of the Switched Telephone Network type.

The input/output controller is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 1 are well known to persons skilled in the art of communication circuits with a processor and more generally information processing circuits. They are therefore not detailed here. The electronic circuit 100 and in particular the central unit 106 are adapted to exploit all the capabilities of the DECT standard known up to the time of the present invention.

The central unit 106 is also adapted to implement the method of the invention and, in particular, the flow diagrams illustrated in the figures.

The random access memory 104 stores, in registers which, for convenience, each bear the same name as the data which they contain:

"Location_table": table containing the data concerning the location of the stations in the system;

"ID": a variable representing the index in the location table of the last mobile station which took the role of relay station. On initialisation of the system, ID takes the value 0 corresponding to the mobile station situated on the first row of the location table;

"IM": a variable representing the current index of the mobile station requested to become a relay station;

"NM": a variable representing the number of mobile stations contained in the location table;

"CI": a variable representing the load on the cell (the ratio between the passband used and the available passband);

"CI_received": a variable representing the load on an adjacent cell, whose value is received from the base station of the adjacent cell (the ratio between the passband used and the available passband);

"CM": a message field; and
"CR": a response field.

The read only memory 105 stores, in registers which, for convenience, each bear the same name as the data which it contains:

"T1": the value of the maximum time to wait between the sending of a message "request_relay" and the reception of a message "relay_accepted" or a message "s_rejected". For example T1 is equal to 200 ms;

"T2": the value of the maximum time to wait between the reception of a message "relay_accepted" and the reception of a message "relay_message_response". For example T2 is equal to 10 s;

"T3": the value of the maximum time to wait after the sending of a detachment message and attachment to (that is to say synchronisation with) a new base station. For example T3 is equal to 1 s;

"T4": the value of the maximum time to wait after the sending of a message "relay_message" and the reception of a message "relay_message_response". For example T4 is equal to 500 ms, and "T5": the value of the maximum time to wait after the sending of a detachment message and synchronisation with the initial base station. For example T5 is equal to 5 s.

"CI_LOW": a constant representing the value below which the passband of the cell is considered to be too little used;

"CI_HIGH": a constant representing the value above which the passband of the cell is considered to be excessively used.

The read only memory 105 constitutes a means of storing information which can be read by a computer or a microprocessor, storing instructions of a computer program characterized in that it makes it possible to implement the method of the invention. According to a variant, the read only memory 105 is removable, partially or totally, and has, for example, a magnetic tape, a flash memory, diskette or a fixed-memory compact disc (CD-ROM).

Figure 2:
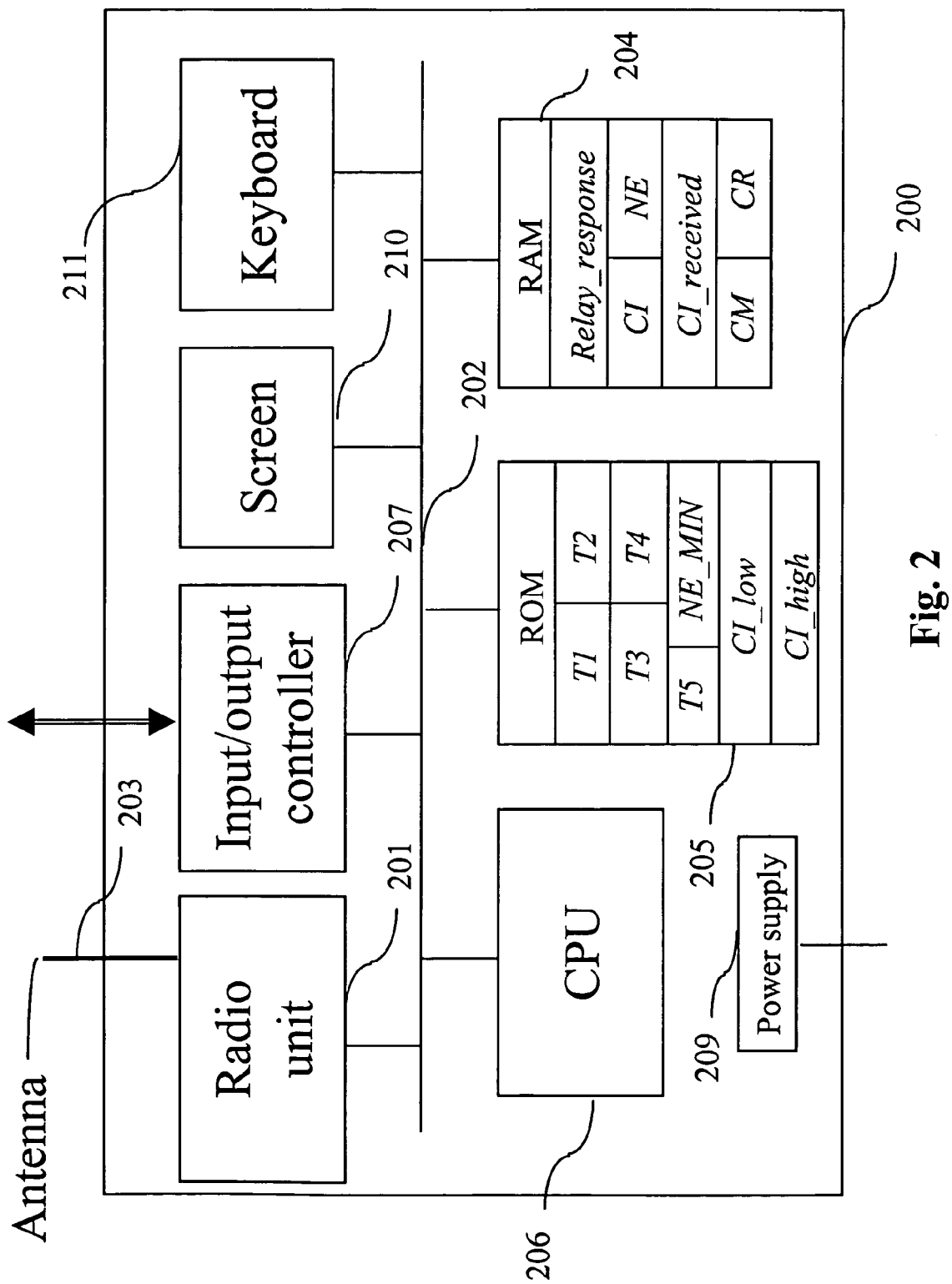
FIG. 2 depicts schematically the architecture of an electronic circuit incorporated in a communication device in accordance with the third and fourth aspects of the present invention and adapted to function in mobile station mode, in connection with the electronic circuit in FIG. 1.

FIG. 2 depicts the electronic circuit of a wireless communication device, using the DECT European standard (specified by the ETSI, ETS 300 175, 1991), functioning in mobile station mode.

This device can be either a DECT mobile station, or a DECT hybrid station. This communication device can be integrated into an item of equipment of the computer, printer, facsimile machine etc type or connected to one of the aforesaid items of equipment. The electronic circuit 200 includes, connected together by an address and data bus 202:

a radio unit 201, provided with an antenna 203,
an input/output controller 207,
a central processing unit 206,
a screen 210,
a keyboard 211,
a read only memory ROM 205, and
a random access memory RAM 204.

In addition, an electrical power supply 209 is provided for supplying all the components of the electronic circuit 200 (the electrical connections concerning the power supply 209 are not shown).

The input/output controller 207 is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 2 are well known to persons skilled in the art of communication circuits with a processor and more generally information processing circuits. They are therefore not detailed here. The electronic circuit 200 and in particular the central unit 206 are adapted to exploit all the capabilities of the DECT standard known up to the time of the present invention.

The central unit 206 is also adapted to implement the method of the invention and, in particular, the flow diagrams illustrated in the figures.

The random access memory 204 stores, in registers which, for convenience, each bear the same name as the data which they contain:

"Relay_response": a temporary variable containing a message of the type "relay_message_response";

"CI": a variable representing the load on the cell (the ratio between the passband used and the available passband);

"CI_received": a variable representing the load on an adjacent cell, whose value is received from the base station of the adjacent cell (the ratio between the passband used and the available passband);

"NE": a variable representing the available energy level of a station whose electrical power supply comes from an accumulator or battery;

"CM": a message field; and
"CR": a response field.

The read only memory 205 stores, in registers which, for convenience, each bear the same name as the data which it contains:

"T1": the value of the maximum time to wait between the sending of a message "request_relay" and the reception of a message "relay_accepted" or a message "relay_rejected". For example T1 is equal to 200 ms;

"T2": the value of the maximum time to wait between the reception of a message "relay_accepted" and the reception of a message "relay_message_response". For example T2 is equal to 10 s;

"T3": the value of the maximum time to wait after the sending of a detachment message and synchronisation with a new base station. For example T3 is equal to 1 s;

"T4": the value of the maximum time to wait after the sending of a message "relay_message" and the reception of a message "relay_message_response". For example T4 is equal to 500 ms, and "T5": the value of the maximum time to wait after the sending of a detachment message and synchronisation with the initial base station. For example T5 is equal to 5 s.

"CI_LOW": a constant representing the value below which the passband of the cell is considered to be too little used;

"CI_HIGH": a constant representing the value above which the passband of the cell is considered to be excessively used.

"NE_MIN": a constant representing the value of NE below which a mobile station must refuse to take the role of relay.

The read only memory 205 constitutes a means of storing information which can be read by a computer or a microprocessor, storing instructions of a computer program characterized in that it makes it possible to implement the method of the invention. According to a variant, the read only memory 205 is removable, partially or totally, and includes, for example, a magnetic tape, a flash memory, a diskette or a fixed-memory compact disc (CD-ROM).

Figure 3:
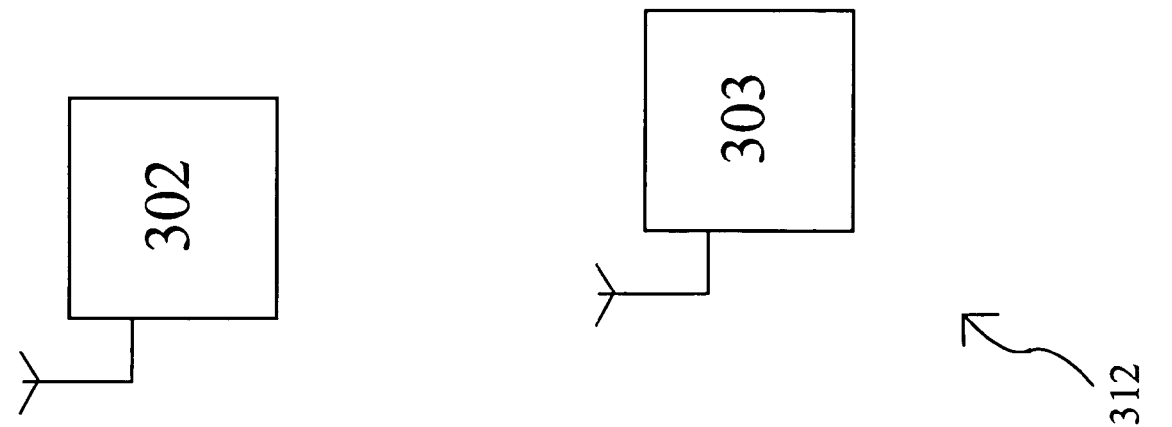
FIG. 3 depicts, schematically, a network implementing the present invention and including two communication stations functioning in base station mode and two communication stations functioning in mobile station mode.
Figure 3:
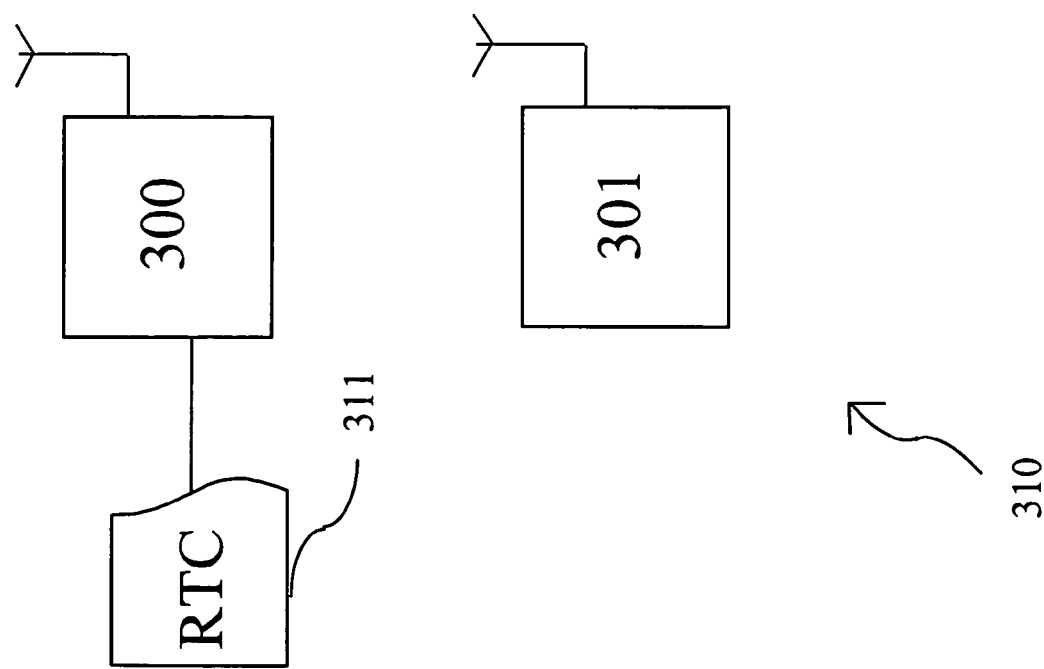

FIG. 3 depicts a local wireless communication network 310 comprising:

a DECT base station 300, connected to an STN network 311,
a DECT mobile station 301,
a DECT mobile station 302,
a DECT hybrid station 303, functioning initially in mobile station mode.

On initialisation of this system, the mobile stations 301, 302 and 303 are synchronised with the base station 300.

In one embodiment of the present invention, if the mobile stations 302 and 303 wish to communicate together, the base station 300 initiates a suitable procedure so that the stations 302 and 303 communicate directly, without transmitting data through the base station 300. To this end, the base station 300 sends a message to the hybrid station 303, requesting it to switch into base station mode, and a message to the mobile station 302, requesting it to synchronise on the station 303.

By virtue of this procedure, a new radio cell 312 is created, which makes it possible to increase the radio passband available in the local wireless network.

The problem is that the stations 302 and 303 are no longer correctly synchronised with the base station 300. Consequently, whilst the stations 302 and 303 constitute a subcell 312 in the local wireless network, neither the station 301 nor the base station 300 can communicate either with the station 302 or with the station 303.

The present invention makes it possible to resolve this problem.

In particular, the present invention aims to transmit short messages (that is to say those which can be contained in the memory of a mobile station and, preferentially, whose transmission requires one or two radio frames), making it possible to transfer a command or an item of information from a first communication device to a second communication device, the first device and the second device being situated in radio cells situated in the same local area, but not being synchronised with each other, nor with the same station functioning in base station mode. The content of the short message can be either intended for the user of the destination station (equivalent to a short message known as SMS, standing for "Short Message System" in the GSM standard, the acronym for "Global System for Mobile communication"), or intended for the central processing unit 206 of the destination station.

The short messages thus transmitted have, for example, the following functions:

notifying the user of a station, 302 or 303, of the arrival of an incoming call coming from the network 311 to which the base station 300 is connected (for example: a telephone call), notifying the user of a station, 302 or 303, of the arrival of electronic mail, notifying the user of a station, 302 or 303, of the arrival of a fax message (when the base station 300 is integrated into a fax or connected to equipment of the fax type), notifying the stations 302 and/or 303 of the state of the base station 300 (for example: the load in terms of radio passband, etc).

Figure 5:
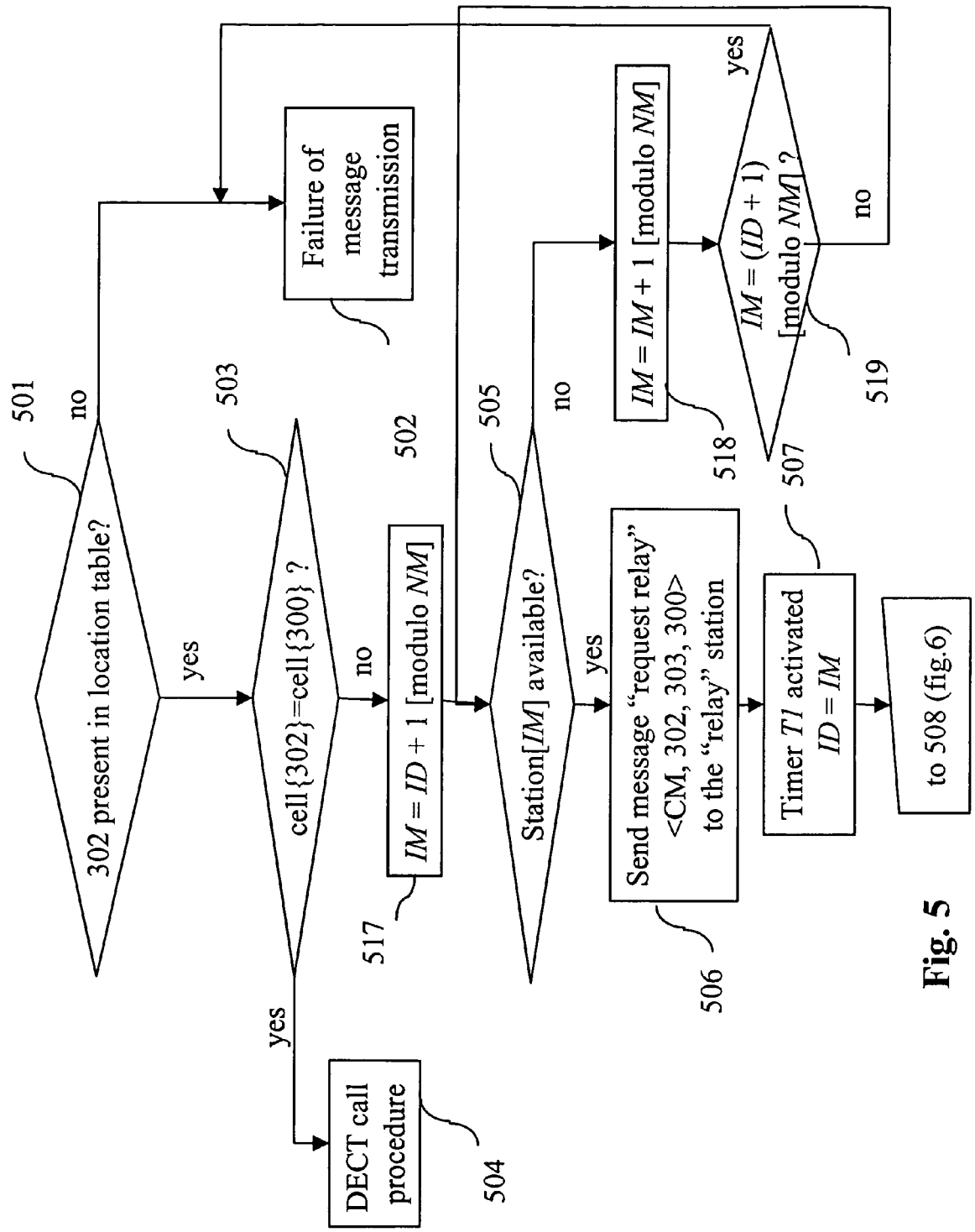
FIGS. 5 and 6 depict an algorithm executed by a station functioning in base station mode for transmitting a request to relay a message to a mobile station.
Figure 6:
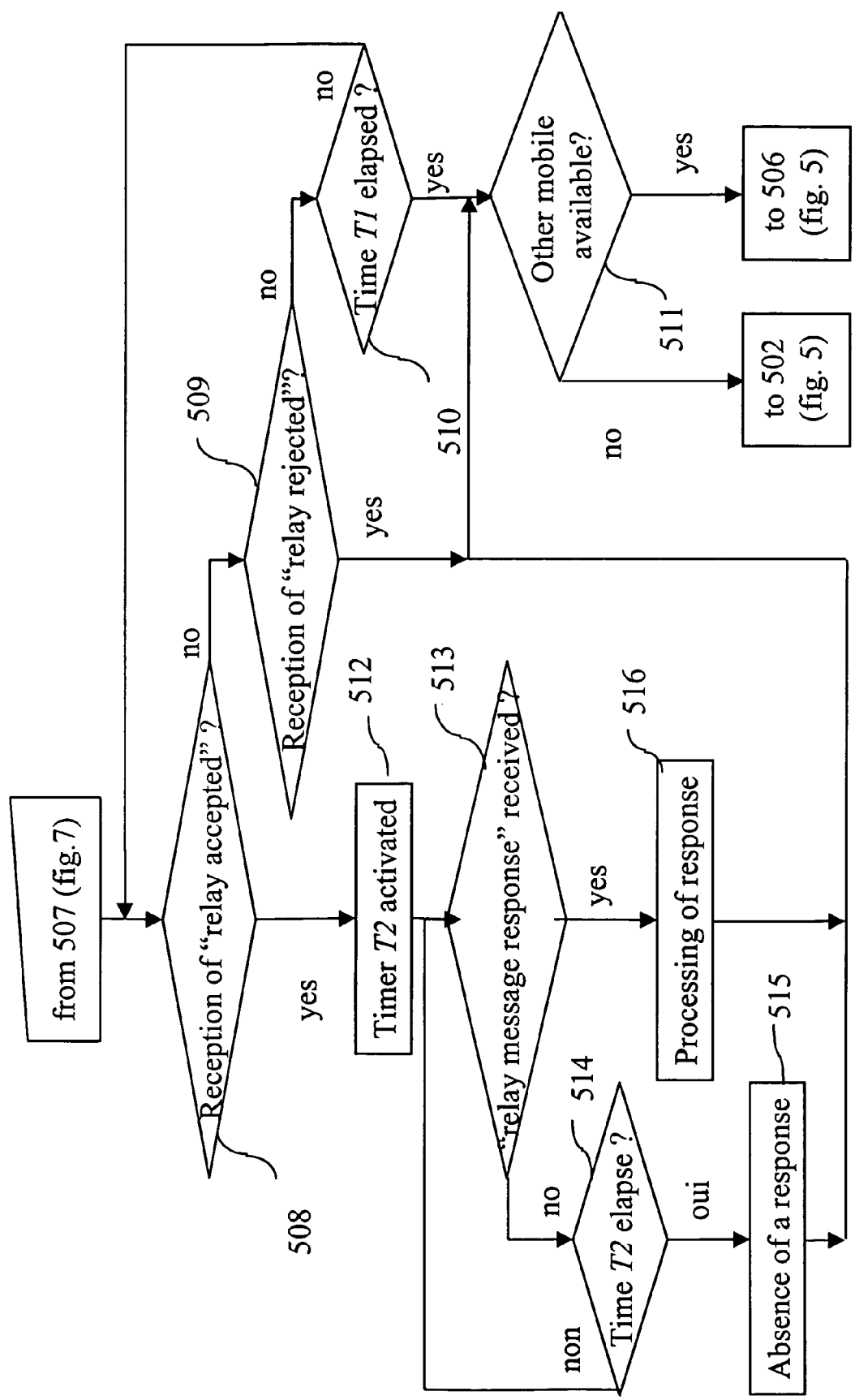

When the base station 300 wishes to send a short message to the station 302, for example, the base station 300 will execute the algorithm illustrated in FIGS. 5 and 6.

It can be seen that, if the station 300 were functioning in mobile station mode, it would execute the same algorithms illustrated in FIGS. 5 and 6.

First of all, during a test 501, the base station 300 attempts to locate the station 302 by determining whether the identifier of the station 302 is situated in a location table illustrated in FIGS. 4a and 4b, which it stores in its random access memory 104.

This table contains:

at top left, the identifier of the station with which the station which stores the location table is synchronised, or its own identifier if this station functions in base station mode, here the identifier 300, on a first column on the left, the identifiers of all the stations which are, at one moment or another, synchronised with this base station 300, here the stations 301, 302 and 303, in a second column, at the centre, the operating mode of the station identified at the head of each row, on the left, and in a third column, on the right, when the station identified at the head of the row is functioning in mobile station mode, the base station with which it is synchronised at the moment when the table is read; when the station identified at the head of the row is functioning in base station mode, the base station with which it was synchronised before switching to base station mode.

Thus, in FIG. 4a, which represents the location table corresponding to a single cell, the three stations 301, 302 and 303 are functioning in mobile station mode, the mode indicated by the letters "PP", the acronym for "portable part", in the central column and are all synchronised on the station functioning in base station mode 300, indicated in the right-hand column.

The location table illustrated in FIG. 4b corresponds to the creation of the subcell 312:

the station 301 functions in mobile station mode synchronised with the station functioning in base station mode 300, the station 302 functions in mobile station mode synchronised with the station functioning in base station mode 303, and the station 303 functions in base station mode (represented by the letters "FP", the acronym of the words "fixed part", in the central column), the right-hand column then indicating that 303 was previously synchronised with 300, and that at the end of the existence of the subcell 312, 303 will resynchronise with 300.

At each modification of the configuration of the system, the base station 300 updates a location table. The initial location table of the system is depicted in FIG. 4a. This table indicates that the cell, for which the station 300 is the base station, has three stations in mobile mode: 301, 302 and 303.

The table depicted in FIG. 4b indicates the configuration of the system after a direct communication cell has been formed between the station 302 and the station 303, as described previously. This table indicates that the station 301 is still synchronised with the station 300 and that, on the other hand, the station 303 has switched into base station mode and the station 302 is synchronised with the station 303.

When the identifier of the station 302 is present in the location table stored in the random access memory 104 of the station 300, the result of the test 501 is positive. When the result of the test 501 is negative, during an operation 502, a failure message is transmitted to the source of the message to be transmitted or to the user of the station 300 and the implementation of the algorithm is terminated until a new message is to be transmitted by the station 300.

When the result of the test 501 is positive, during a test 503, the central unit 106 determines whether the station 302 is in the same cell as the station 300, that is to say whether they are both synchronised with the same base station or whether one of them is functioning in base station mode and the other is synchronised on it.

During the test 503, the central unit 106 determines whether or not the indicator indicated in the right-hand column of the location table, in the row corresponding to station 302, is the identifier of the station 300.

When the result of test 503 is positive, during an operation 504, the station 300 transmits the message which it has to deliver to the station 302 in accordance with the procedures known in the implementation of the DECT standard.

When the result of test 503 is negative, during an operation 517, the index IM takes the value of the index of the last mobile station which served as a relay, incremented by one, modulo the value of NM (which means that if ID+1=NM then IM takes the value 0). Thus, if the system includes several mobile stations, it will not always be the same mobile station which will be requested to become a relay station.

Step 517 is followed by step 505, during which the central unit 106 determines whether the mobile station corresponding to the index IM is available for becoming a relay station. It should be stated here that a station is considered to be available if it is operating in mobile station mode (and not in base station mode) and if it is not currently communicating (sending or receiving) a message.

When the result of test 505 is negative, the operation 518 is performed. During the operation 518, the index IM is incremented by 1 modulo MN. Next, during a test 519, the central unit 106 determines whether or not the value of IM is equal to that of ID+1, modulo NM. If the result of test 519 is positive, the operation 502 is performed.

If the result of 519 is positive, the operation 505 is reiterated with the new value of IM.

According to a variant, not depicted here, the rotating selection of a relay mobile station (operation 517, 505, 518, 519), can be replaced by a pseudo-random selection.

When the result of test 505 is positive, during an operation 506, the central unit 106 sends to the available mobile station, here the station 301, a message "request_relay" of the form <CM, 302, 303, 300>, in which the first term, CM, represents the content of the message to be transmitted, the second term, here 302, indicates the final destination of the message, the third term, here 303, indicates the station functioning in base station mode with which the station 301 will have to synchronise for the transmission of the message, and the fourth term, here 300, indicates the message source station.

Then, during an operation 507, a clock pulse downcounter is initialised and started. Such a pulse downcounter is known as a timer. The period T1 during which its value is positive is known in advance. When its value reaches "0", its operation is automatically stopped. In addition, the variable ID is then updated with the value of IM, so that, when a future relay message is transmitted, the selection of the new relay station does not commence with the station corresponding to the index ID.

Next, during a test 508 (FIG. 6), the central unit 106 determines whether or not a message "relay_accepted" has been received from the station 301. When the result of the test 508 is negative, during a test 509, the central unit 106 determines whether or not a message "relay_rejected" has been received by the station 301. When the result of the test 509 is negative, during a test 510, the central unit 106 determines whether the period T1 has elapsed, by determining whether or not the value of the timer of period T1 is nil.

When the result of test 510 is negative, test 508 is reiterated. When the result of test 510 is positive, during a test 511, the central unit 106 determines whether or not a mobile station other than the station 301 (and more generally, whether or not all the mobile stations already considered to be available during the message transmission attempt under consideration) is available in the cell. When the result of 511 is negative, operation 502 is performed. When the result of test 511 is positive, operation 506 is reiterated, taking account of the new mobile station considered to be available.

When the result of test 509 is positive, test 511 is performed. When the result of test 508 is positive, during an operation 512, a timer of duration T2 is initialised and started. Then, during a test 513, the central unit 106 determines whether or not a message "relay_message_response" has been received from the station 302. When the result of test 513 is negative, during a test 514, the central unit 106 determines whether or not the value of the timer of duration T2 is nil.

Figure 7:
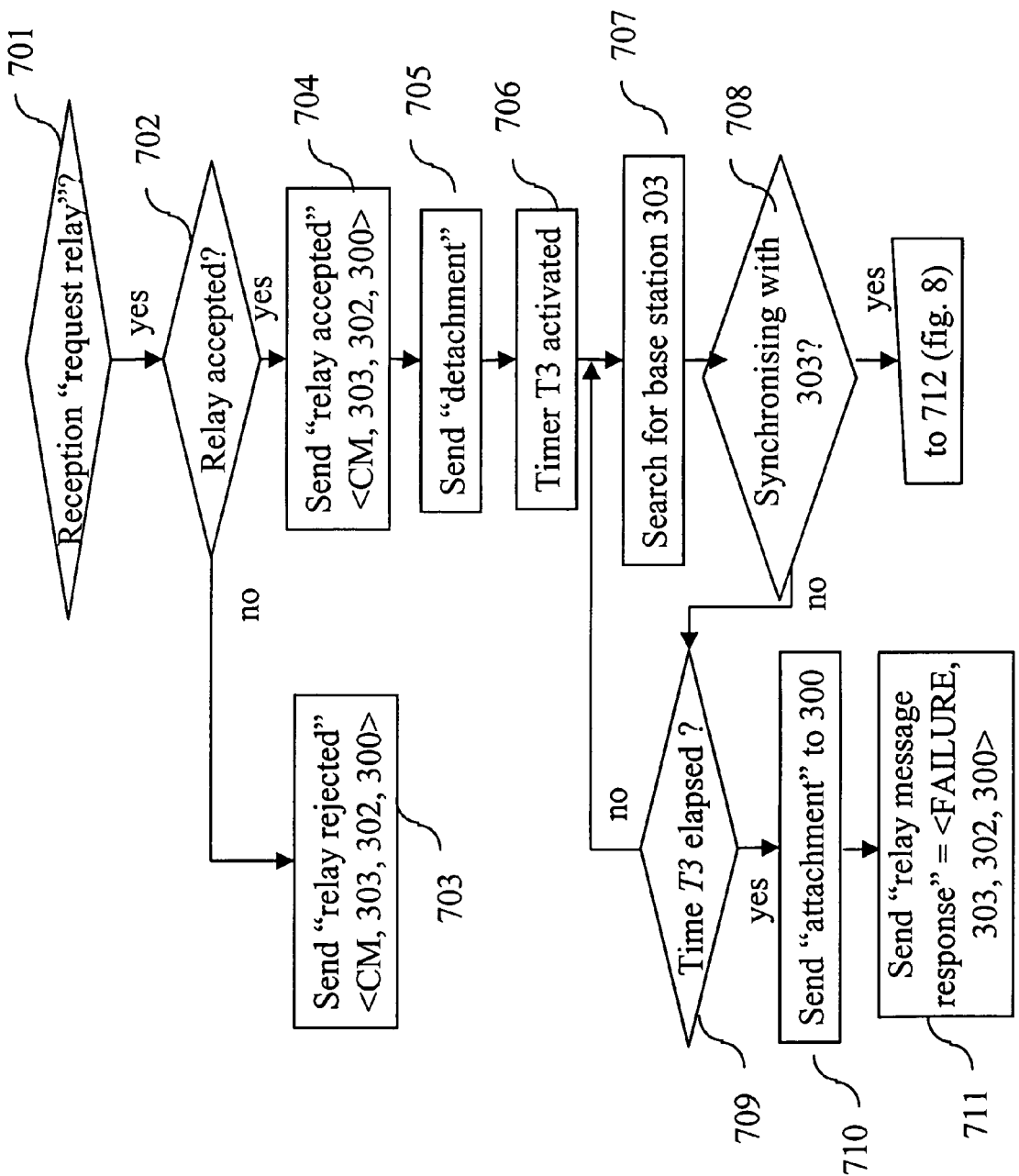
FIG. 7 depicts an algorithm executed by a station functioning in mobile station mode on reception of a request to relay a message.

When the result of test 514 is negative, test 513 is reiterated. When the result of test 514 is positive, during an operation 515, the absence of a response is processed. For example, test 511 is performed. When the result of test 513 is positive, during an operation 516, the response received from the station 302 is processed and, in the event of failure of the processing (for example if the message "relay_message_response" contains information representing failure, see operation 711, FIG. 7), the test 511 is performed. FIG. 7 illustrates the algorithm implemented by the station 301, during the functioning of the station 300 illustrated in FIGS. 5 and 6, when the station 301 is the station considered as being available during the operation 505.

The central unit 206 of the station 301 determines, during a test 701, whether or not a message "request_relay" for the station 301 has been received. When the result of test 701 is positive, during a test 702, the central unit 206 of the mobile station 301 determines whether or not the relay role is accepted.

According to a first example of implementation of this test 702, the central unit 206 determines whether a communication would be interfered with by the detachment and attachment operation and, if during the availability test 702 it is determined that no communication would be interfered with by a detachment and attachment operation, the result of test 702 is positive.

According to a second example, the central unit 206 determines whether or not the station 301 is participating in a current communication and, if it is participating in a current communication, it is determined that a communication would be interfered with by a detachment and attachment operation and the result of test 702 is negative.

According to a third example, the central unit 206 determines whether or not a quantity of energy available to the station 301 is greater than a predetermined quantity and, if during test 702 it is determined that the quantity of energy is greater than said predetermined quantity, the result of test 702 is positive. Thus the central unit 206 can, where the power supply to the mobile station comes from an accumulator or battery, determine whether the current value of the available energy level (NE) is greater than a predefined value (NE_MIN), in order to accept or not the role of relay.

According to a fourth example, if the central unit 206 determines that the station 301 will have no message to send or receive during a predetermined period T2 to come, it considers that the role of relay must be accepted (result of test 702 positive) and that otherwise it must be refused.

When the result of test 702 is negative, that is to say when the role of relay is refused, the central unit 206 causes to be sent to the station 301 a message "relay_rejected" of the form <CM, 303, 302, 300> in which the first term, CM, represents the content of the message, the second term, 303, represents the base station with which the station 301 was to synchronise, the third term, 302, represents the message destination station and the fourth term, 300, represents the station at the source of the message.

When the result of the test 702 is positive, that is to say when the station 301 accepts the role of relay, the central unit 206 causes to be sent to the station 301 a message "relay_accepted" of the form <CM, 303, 302, 300> in which the first term, CM, represents the content of the message, the second term, 303, represents the base station with which the station 301 is to synchronise, the third term, 302, represents the message destination station and the fourth term, 300, represents the source of the message.

Then, during an operation 705, the central unit 206 causes the detachment of the station 301 from the base station 300, in accordance with known procedures, including notably the sending of a detachment message to the base station 300.

Then, during an operation 706, the central unit 206 initialises a timer of predetermined duration T3 and starts it. Next, during an operation 707, the central unit 206 seeks the base station 303 in order to synchronise with it. Then, during a test 708, the central unit 206 determines whether or not the base station 301 has succeeded in synchronising with the base station 303. When the result of test 708 is negative, during a test 709, the central unit 206 determines whether or not the value of the timer of predetermined period T3 is nil. When the result of test 709 is negative, operation 707 is reiterated. When the result of test 709 is positive, the central unit 206, which has remained synchronised with the base station 300, sends it an attachment message during an operation 710.

It should be noted here that one reason why the mobile station 301 cannot synchronise with the station 303 may be that the stations 301 and 303 are situated at two ends of the local area and that the synchronisation signal sent by the base station 303 is too weak or too noisy to be correctly received and used by the mobile station 301.

Then, during an operation 711, the central unit 206 causes the sending by the station 301 of a message "relay_message_response" of the form <FAILURE, 303, 302, 300> in which the first term "FAILURE" indicates that the message to be relayed has not been able to be transferred, the second term, 303, represents the base station with which the station 301 was to synchronise, the third term 302, represents the message destination station and the fourth term, 300, represents the station at the source of the message.

When the result of test 708 is positive, during an operation 712 (FIG. 8), the central unit 206 causes the sending of attachment message to the base station 303. Then, during an operation 713, the central unit 206 causes the sending, to the station 302, of a message "relay_message" of the form <CM, 300> in which the first term, CM, represents the content of the message and the second term, 300, represents the source of the message.

Next, during an operation 714, the central unit 206 initialises a timer of predetermined duration T4 and starts it. Next, during a test 715, the central unit 206 determines whether or not a message "relay_message_response" has been received from the mobile station 302. When the result of test 715 is negative, during a test 716, the central unit 206 determines whether or not the value of the timer of duration T4 is nil. When the result of test 716 is negative, the test 715 is reiterated. When the result of test 716 is positive, during an operation 717, a message "response_relay" is formed in the form <NONE, 300, 302> in which the first term indicates that no response has been received from the station 302, the second term indicates the destination station for the message "response_relay" and the third term indicates the station from which a message "relay_message_response" was awaited.

When the result of test 715 is positive, during an operation 718, a message "response_relay" is formed in the form <CR, 300, 302> in which the first term contains the content of the response, a content drawn from the message "relay_message_response"transmitted by the station 302, the second term indicates the destination station for the message "response_relay" and the third term indicates the station from which a message "relay_message_response" was awaited.

Following one or other of operations 717 and 718, during an operation 719 (FIG. 9), the central unit 206 causes the sending, to the base station 303, of a detachment message. Then, during an operation 720, the central unit 206 initialises a timer of predetermined duration T5 and starts it. Then, during an operation 721, the central unit 206 seeks the base station 300, the station which is the source of the message "request_relay".

During a test 722, the central unit 206 determines whether or not the station 301 has succeeded in synchronising with the base station 300. When the result of test 722 is negative, during a test 723, the central unit 206 determines whether or not the value of the timer of duration T5 is nil. When the result of test 723 is negative, operation 721 is reiterated. When the result of test 723 is positive, the central unit 206, which has remained synchronised with the base station 303, sends an attachment message to it, during an operation 724.

When the result of test 722 is positive, during an operation 725, the central unit 206 causes an attachment message to be sent by the mobile station 301 to the base station 300. Then, during an operation 726, the central unit 206 causes the message "response_relay" to be sent by the mobile station 301 to the station which is the destination of the message "response_relay" (station 300).

At the end of one of the operations 724 or 726, the implementation of the algorithm followed by the central unit of the mobile station 301 is ended.

Figure 10:
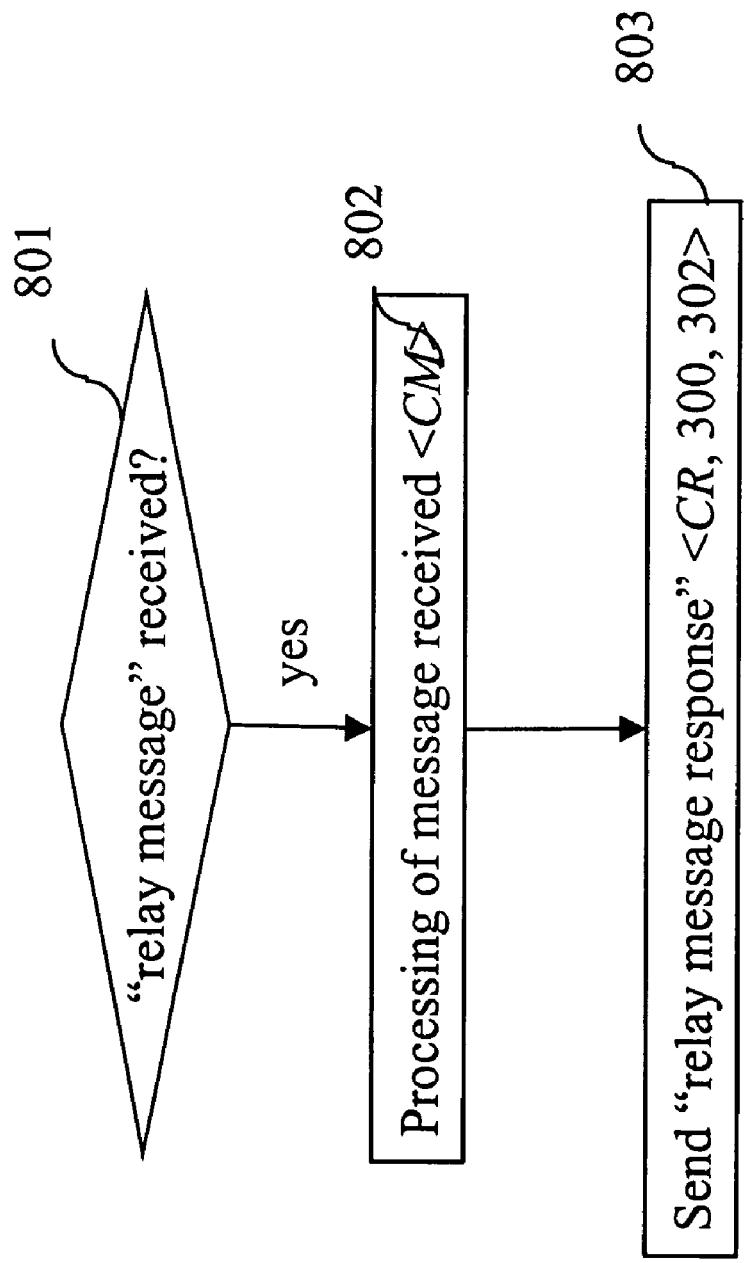
FIG. 10 depicts an algorithm executed by a communication station having received a short message.

FIG. 10 illustrates an algorithm followed by the central unit 206 of the station 302 which is the destination of a message coming from the station 300, by means of the station 301 which served as a relay between two adjacent cells.

First of all, during a test 801, the central unit 206 determines whether or not a message "relaymessage" has been received. When the result of test 801 is positive, during an operation 802, the central unit 206 performs a processing of the content of the message received. Then, during an operation 803, the central unit 206 effects a sending of a message "relay_message_response" of the form <CR, 300, 302> in which the first term contains the content of the response intended for the station 300, indicated by the second term, the third term indicating the station which is the source of this message.

By way of example, the content of this message may mean that the station 302 will detach itself from the station 303 and synchronise with the station 300 with a view to receiving a message.

Figure 11:
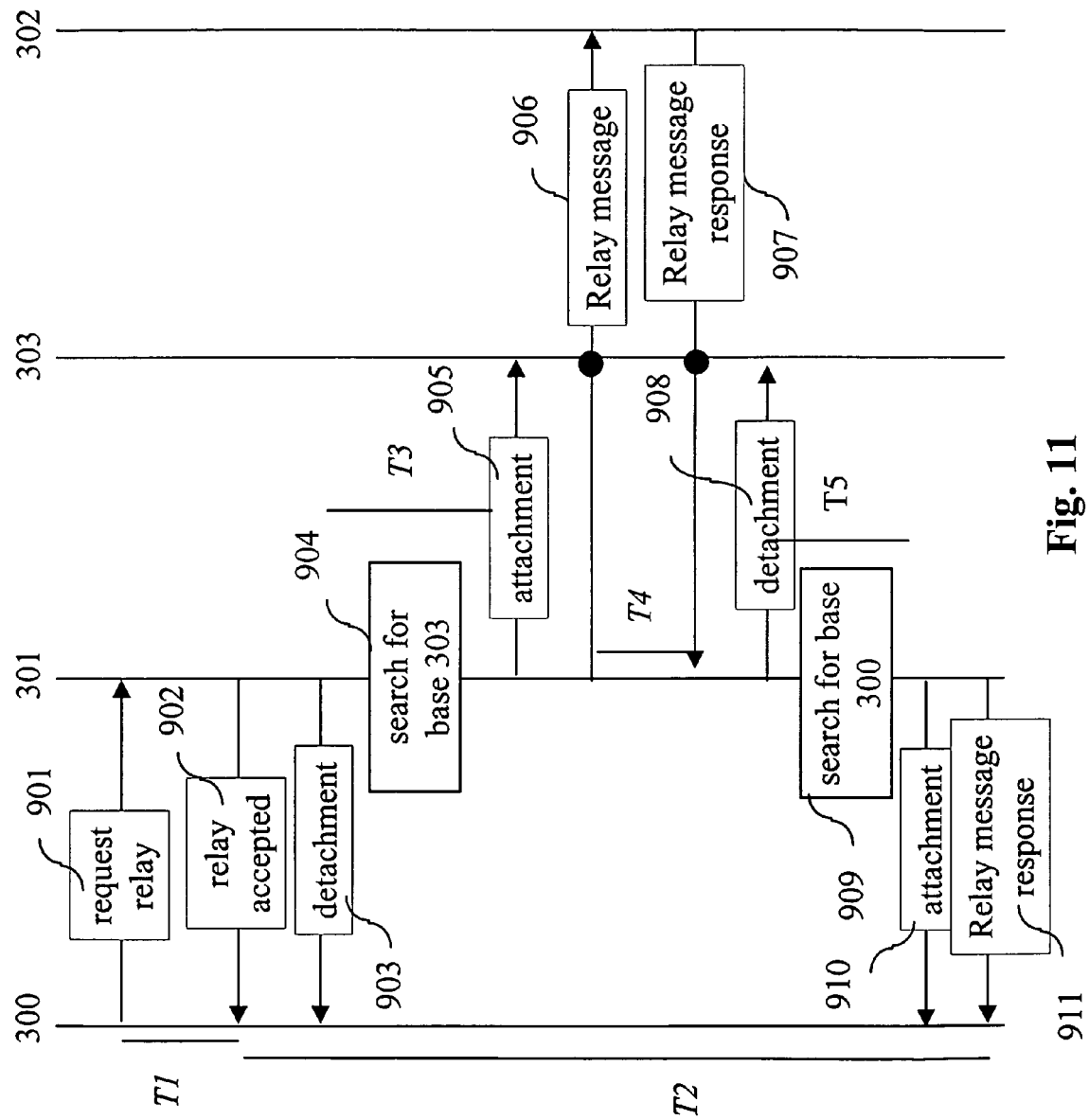
FIG. 11 depicts a succession of radio messages for the transmission of a message between two communication stations belonging to two non-synchronised local cells.

In FIG. 11, there can be seen, for the four stations 300, 301, 302 and 303, depicted by vertical continuous lines, the transmissions and receptions of messages in the cell including these four stations.

The lapse of time is depicted from top to bottom, each period of a timer being depicted by a segment of a vertical straight line.

Only the messages sent when the transmission of a message from station 300 to station 302, by means of the stations 301, as a relay station, and 303, as a base station, with the return of a response, is a success, are shown, as well as the periods of searching for synchronisation signals by the station 301.

First of all, a message "request_relay" 901 is sent by the station 300 to the station 301 (operations 506, FIGS. 5 and 701, FIG. 7).

Then a message "relay_accepted" 902 is sent by the station 301 to the station 300 (operations 704, FIGS. 7 and 508, FIG. 6).

Next a detachment message 903 is sent by the station 301 to the base station with which it was, until then, synchronised (operation 705).

Then the station 301 seeks the synchronisation signal sent by the base station 303 (operation 707, FIGS. 7 and 904, FIG. 11).

Figure 8:
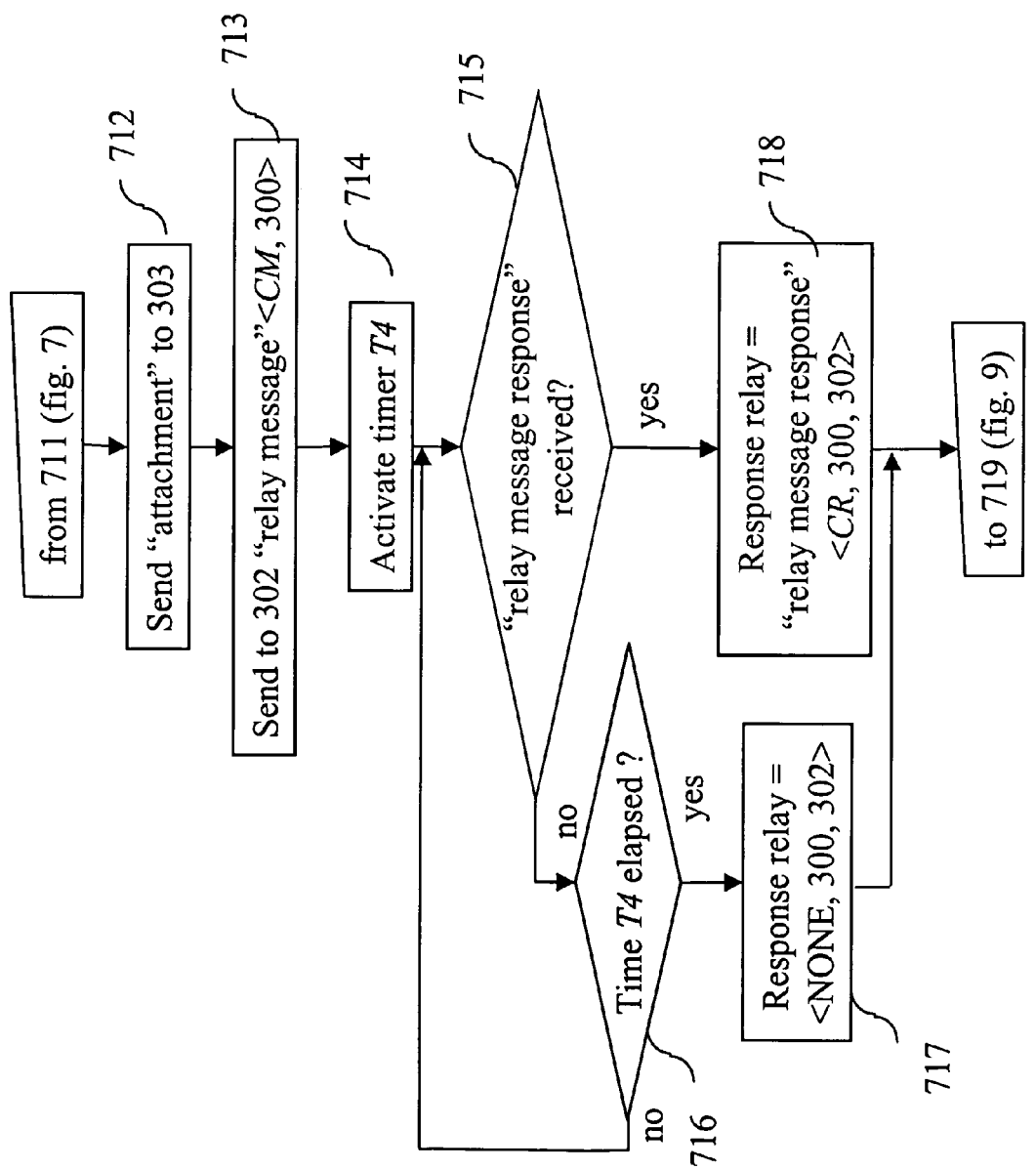
FIG. 8 depicts an algorithm executed by a station functioning in mobile station mode for relaying a message.

Next the station 301 sends, to the station 303, an attachment message 905 (operation 712, FIG. 8).

Then the station 301 sends, by means of the station 303, to the station 302, a message "relay_message" 906 (operations 713, FIG. 8, and 801, FIG. 10).

Next the station 302 sends, by means of the station 303, to the station 301, a message "relay_messag_response" 907 (operations 715, FIG. 8 and 803, FIG. 10).

Figure 9:
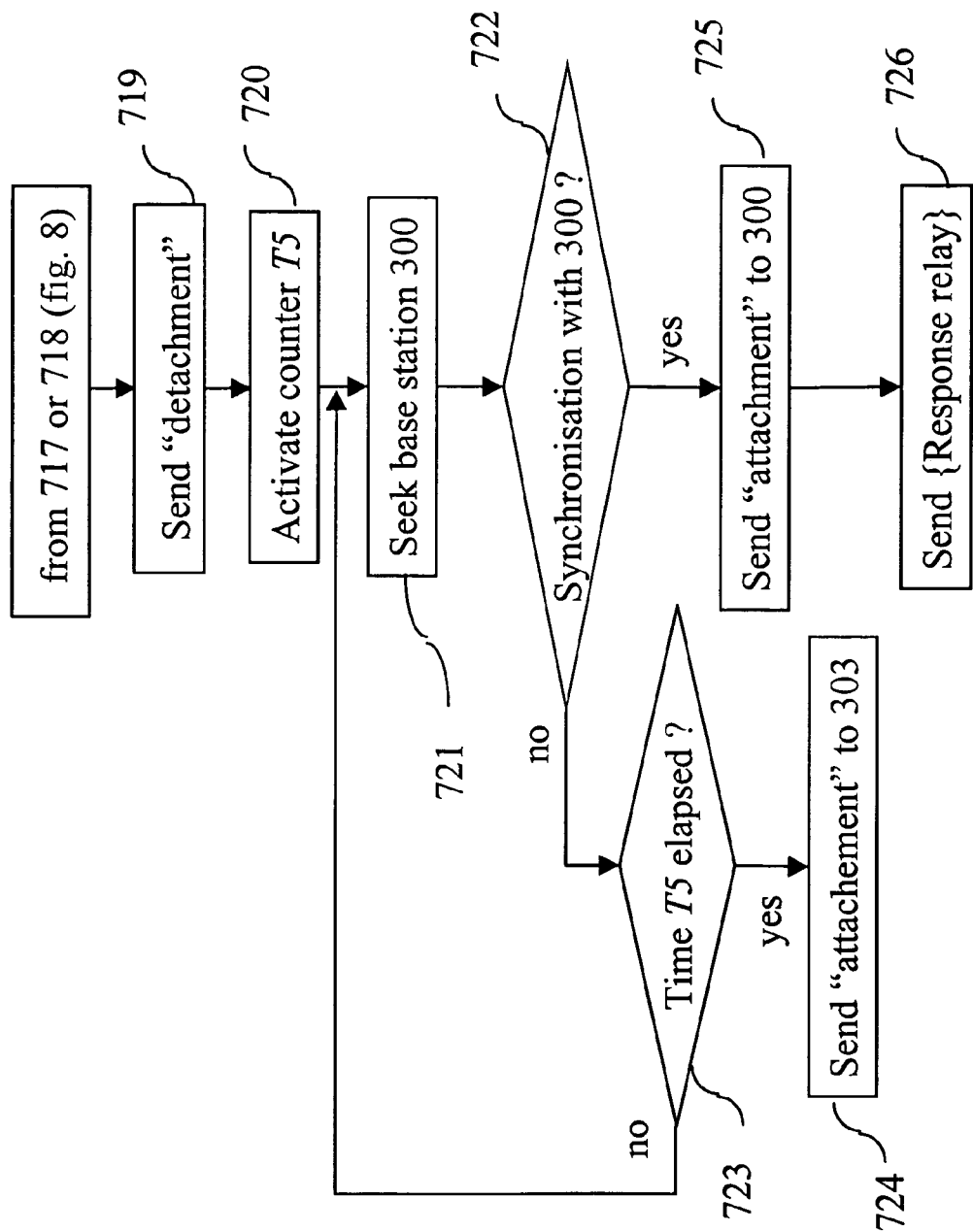
FIG. 9 depicts an algorithm executed by a station functioning in mobile station mode having relayed a message.

Then the station 301 sends a detachment message 908 to the base station 303 (operation 719, FIG. 9).

Then the station 301 seeks the synchronisation signal sent by the base station 300 (operation 721, FIG. 9, and 909, FIG. 11).

Next the station 301 sends an attachment message 910 to the station 300 (operation 725, FIG. 9).

Finally, the station 301 sends a message "relay_message_response" 911 to the station 300 (operations 513, FIG. 6, and 726, FIG. 9).

An example of an application of this invention concerns the distribution of the data stream between two adjacent cells. For this purpose a short message of the type CM="LOAD_INFO {Identity FP, cell load}" can be exchanged between the two base stations of two adjacent cells, the first term representing the identity of the base station of a cell, and the second term representing the load on the cell (the ratio between the passband used and the available passband).

Figure 12:
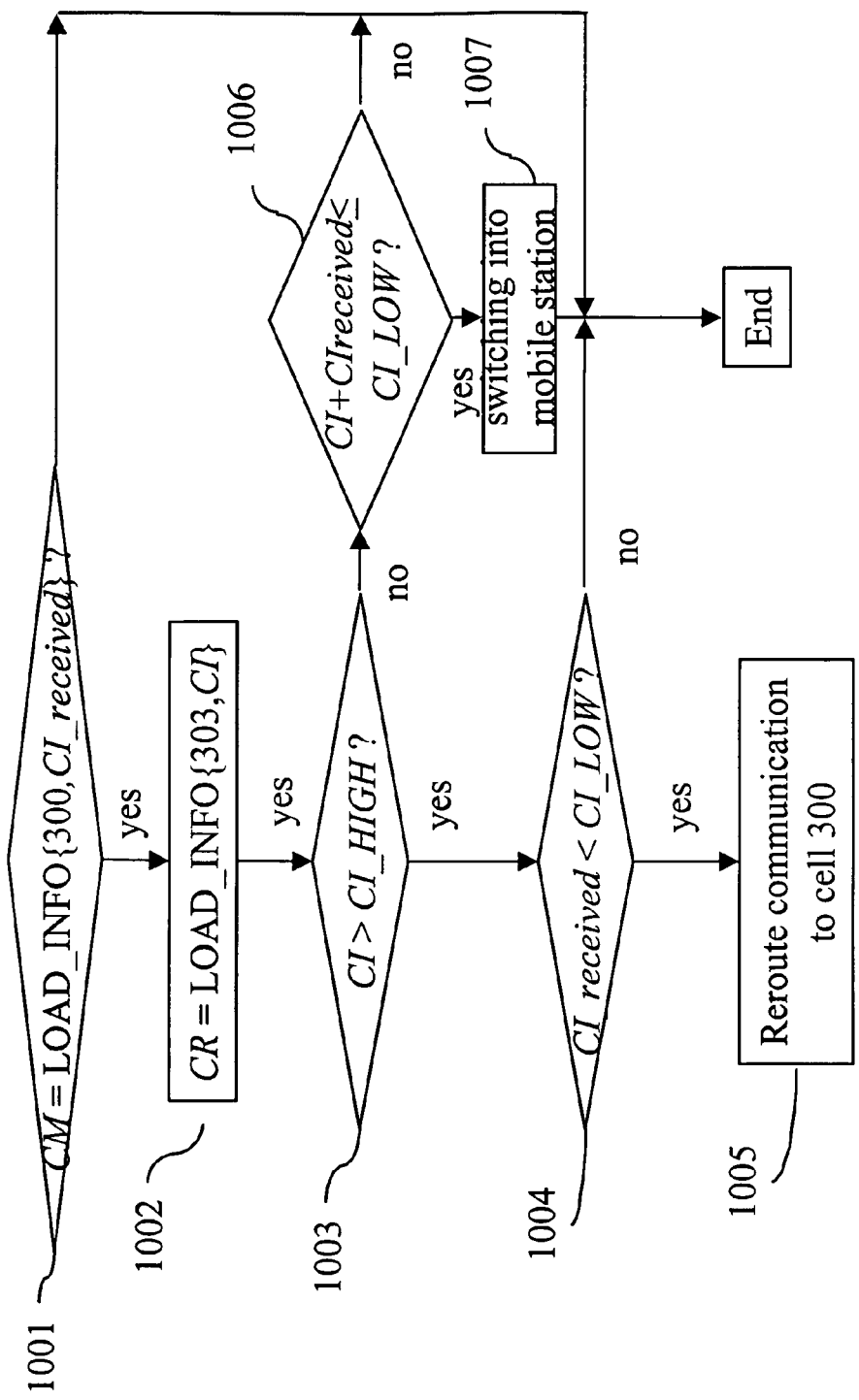
FIG. 12 depicts an algorithm executed by a second base station which has received a message informing it of the load on a first base station.

FIG. 12 depicts the algorithm executed by the base station 303 when it receives a message of the type "LOAD_INFO", test 1001 positive.

It can be seen here that such a message can be sent by a base station to an adjacent cell when the value of its load CI, permanently stored in random access memory 104, is less than the value CI_LOW stored in read only memory 105.

On receipt of this message, the station 303 prepares and sends a response to this message, which contains the control field "LOAD_INFO" as well as the value CI read in the random access memory 204, representing the load on the cell for which the station 303 is the base station, during an operation 1002. The content of the response, that is to say the content of the field CR, is transmitted as indicated at step 803. The station 303 then analyses whether or not its passband is excessively used, during a test 1003, by determining whether or not the value of CI read in the random access memory 204 is greater than the value CI_HIGH stored in read only memory 205.

If the result of the test 1003 is positive, during a test 1004, the central unit 206 determines whether or not the passband available in the cell for which the station 300 is the base station is too little used. If the result of the test 1004 is negative then no specific processing is to be carried out and the implementation of the algorithm illustrated in FIG. 12 ends. On the other hand, if the result of the test 1004 is positive, the base station 303 attempts to redirect a communication established in its cell to the base station 300 so that all the stations to which said communication relates synchronise on the base station 300 with a view to balancing the available passband between the two cells.

This can be done only in the case of an internal communication, or in the case of a communication to an external network or to a printer if the base stations 300 and 303 can offer the same service concerning this external communication or this printer.

In order to reroute a communication from the cell of the base station 303 to the base station 300, during an operation 1005, the base station 303 sends, to the mobile stations involved in the communication to be rerouted, a message indicating to them that they should synchronise with the station 300.

If the result of the test 1003 is negative, during a test 1006, the central unit 206 determines whether or not the sum of CI_received and the value of CI stored in the random access memory 204 is less than the value CI_LOW stored in the read only memory 205. When the result of the test 1006 is positive, the station 303 switches into mobile station mode, during an operation 1007. In this way, the two cells merge, that is to say all the mobile stations in the cell for which the base station was the station 303 and this station 303 synchronise with the base station 300.

When the result of test 1006 is negative, no change to the functioning of the station 3003 is made.

Figure 13:
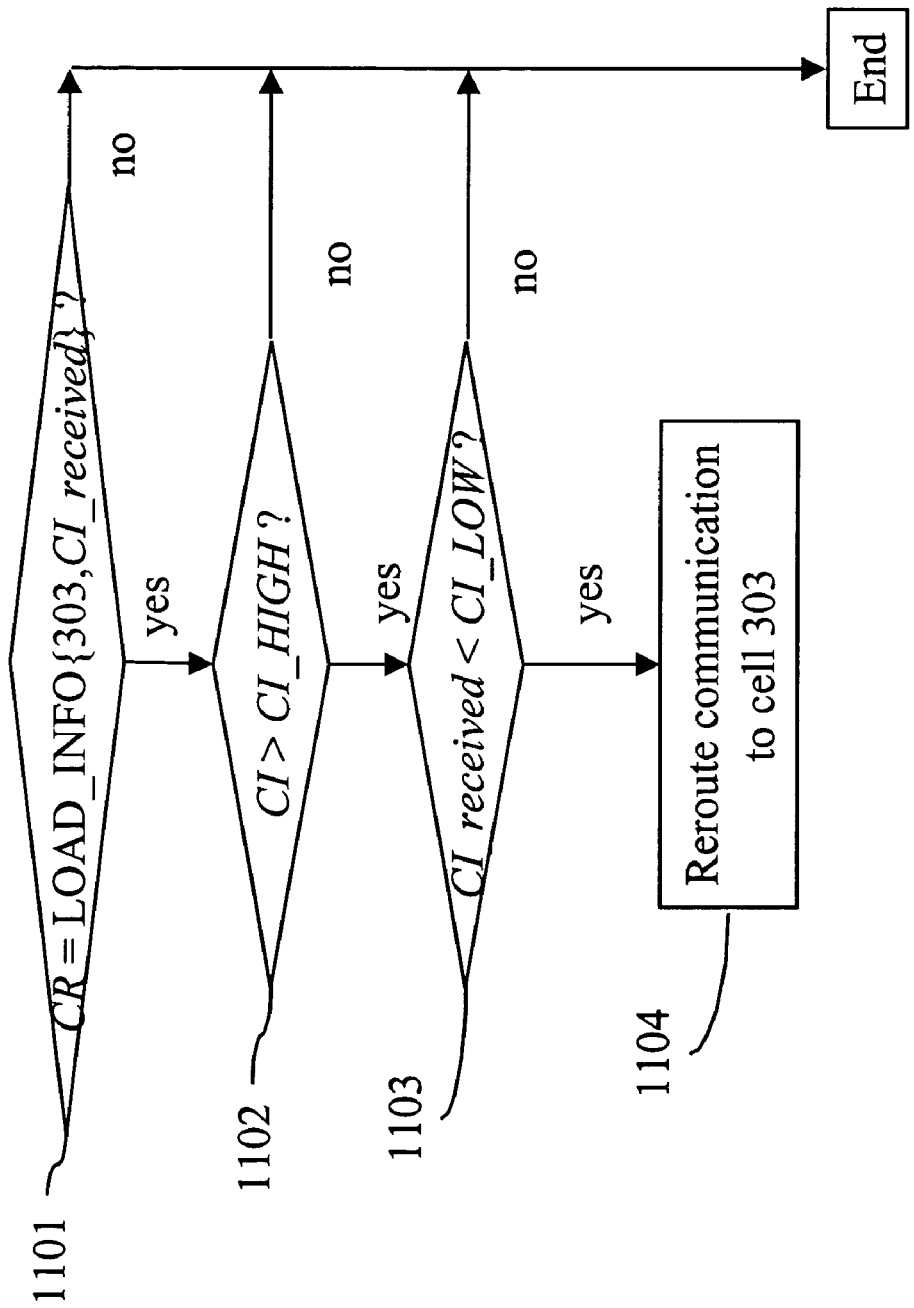
FIG. 13 depicts an algorithm executed by a first base station which has received a response coming from a second base station to a message informing of the load on the first base station.

FIG. 13 depicts the algorithm executed by the base station 300, when it receives a response to a short message of the type "LOAD_INFO". The reception of this response is determined by a test for the reception of such a message 1101.

During a test 1102, the central unit 106 of the station 300 determines whether or not the passband of the cell of the base station 300 is excessively used, determining whether or not the value of the variable CI stored in the random access memory 104 is greater than the value of CI_HIGH stored in the read only memory 105.

When the result of the test 1102 is positive, during a test 1103, the central unit 106 determines whether or not the value of the passband of the cell for which the base station is the station 303, a value which is transmitted in the response message, is less than the value CI_LOW stored in the read only memory 105.

When the result of the test 1102 is negative or when the result of the test 1103 is negative, no change to the functioning of the cell for which the station 300 is the base station is made at the initiative of the station 300.

When the result of the test 1103 is positive, during an operation 1104, the base station 300 attempts to redirect a communication established in its cell to the base station 303 so that all the stations to which said communication relates synchronise on the base station 303 with a view to balancing the passband available between the two cells.

This can take place only in the case of an internal communication, or in the case of a communication to an external network or to a printer if the base stations 300 and 303 can offer the same service concerning this external communication or this printer.

In order to reroute a communication from the cell of the base station 300 to the base station 303, the base station 300 sends, to the mobile stations involved in the communication to be rerouted, a message indicating to them that they should synchronise with the station 303.

Figure 14:
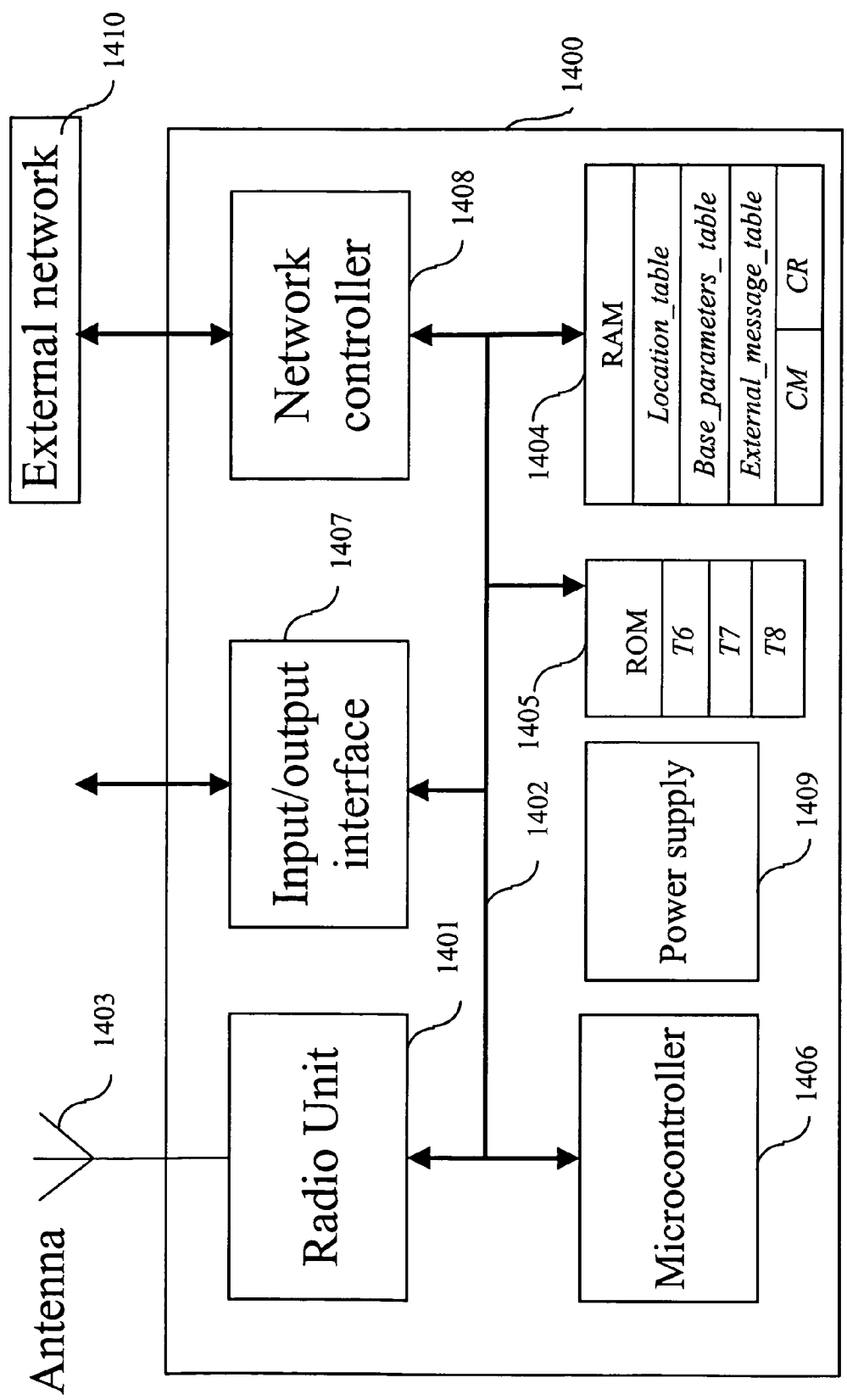
FIG. 14 depicts schematically the architecture of an electronic circuit incorporated in a source station in accordance with the seventh and eighth aspects of the present invention.

FIG. 14 depicts the electronic circuit of a wireless communication device, using the DECT European standard (specified by the ETSI, ETS 300 175, 1991), which can be connected to a network of the STN (Switched Telecommunication Network), Ethernet etc type.

This device can be either a DECT base station, or a DECT hybrid station. A DECT base station is responsible notably for providing the synchronisation of the system. A hybrid station is a communication station which can alternately operate as a base station or as a mobile station. This communication device can be integrated into equipment of the computer, printer, fax etc type or be connected to one of the aforementioned items of equipment. The electronic circuit 1400 includes, connected together by an address and data bus 1402:

a radio unit 1401, provided with an antenna 1403,
an input/output controller 1407,
a network controller 1408,
a central processing unit 1406,
a read only memory ROM 1405, and
a random access memory RAM 1404.

In addition, an electrical power supply 1409 is provided for powering all the components of the electronic circuit 1400 (the electrical connections concerning the power supply 1409 are not shown).

The network controller 1408 manages the interface with an external network 1410, for example of the Switched Telephone Network type.

The input/output controller 1407 is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 14 are well known to persons skilled in the art of communication circuits with a processor and more generally information processing circuits. They are therefore not detailed here. The electronic circuit 1400 and in particular the central unit 1406 are adapted to exploit all the capabilities of the DECT standard known up to the time of the present invention.

Figure 18:
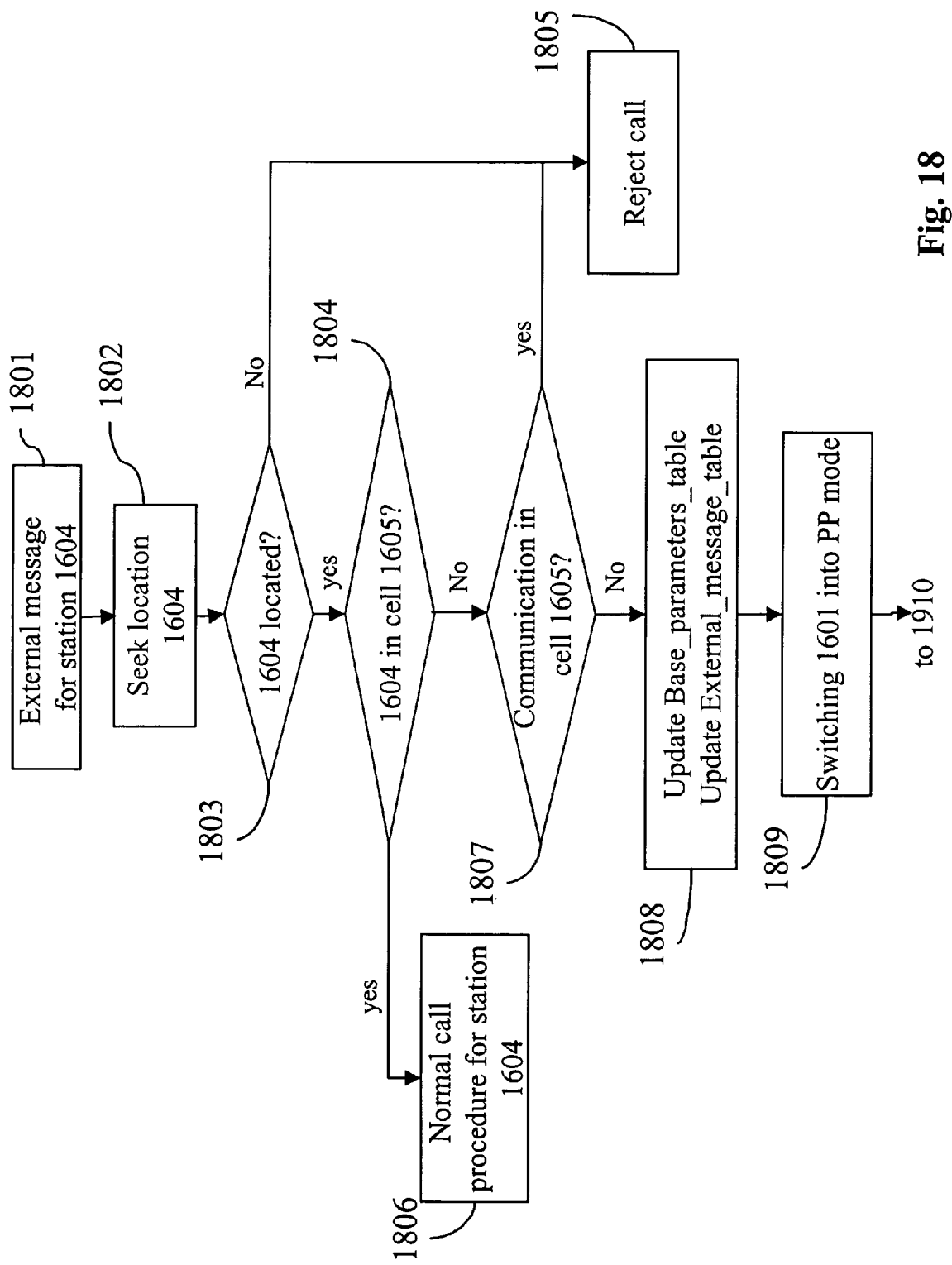
FIGS. 18 and 19 depict an algorithm executed by a source station functioning initially in base station mode, in order to send a message to a destination station.
Figure 19:
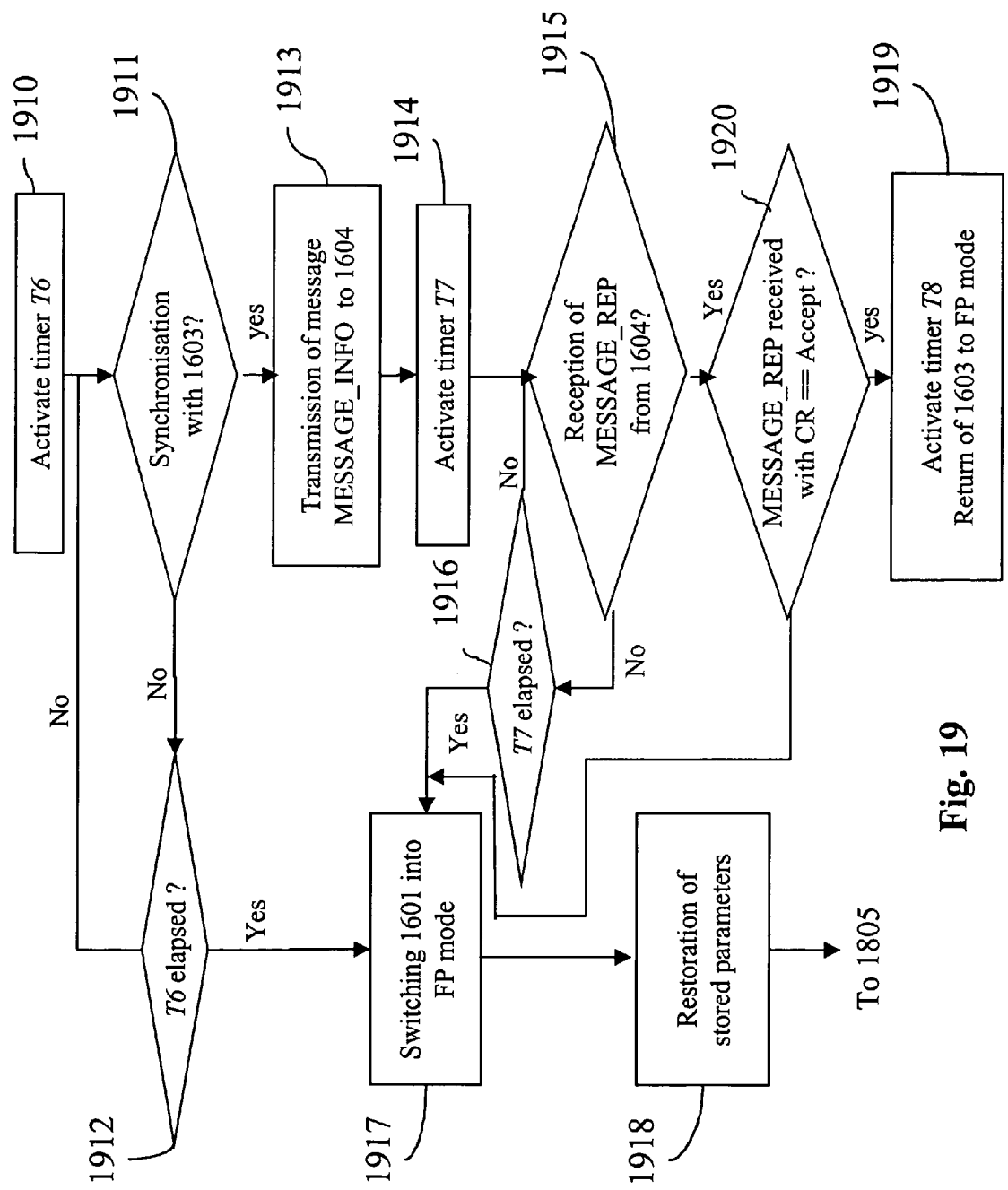

The central unit 1406 is also adapted to implement the method of the invention and, in particular, the flow diagrams illustrated in FIGS. 18 and 19.

The random access memory 1404 stores, in registers which, for convenience, each bear the same name as the data which they contain:

"Location_table": table containing the data concerning the location of the stations in the system;

"Base_parameters_table": table containing the values of the parameters for operating in base station mode;

"External_message_table": table of messages coming from the network 1410;

"CM": message field in which there is placed the content of a message intended for a destination station; and "CR": response field in which there is placed a response coming from the destination of a message.

The read only memory 1405 stores, in registers which, for convenience, each bear the same name as the data which they contain:

"T6": the value of the maximum period allowed for a station to synchronise with a base station (see tests 1911 and 1912, FIG. 19). For example T6 is equal to 1 second;

"T7": value of the maximum period allowed for receiving a response message after having transmitted an information message (see tests 1915 and 1916, FIG. 19). For example, T7 is equal to 500 ms; and "T8": the value of the maximum period allowed for the destination station to synchronise with a station which has transmitted an information message to it (see operation 1919, FIG. 19). For example T8 is equal to 5 s.

The read only memory 1405 constitutes a means of storing information which can be read by a computer or a microprocessor, storing instructions of a computer program characterized in that it makes it possible to implement the method of the invention. According to a variant, the read only memory 1405 is removable, partially or totally, and has, for example, a magnetic tape, a flash memory, a diskette or a fixed-memory compact disc (CD-ROM).

Figure 15:
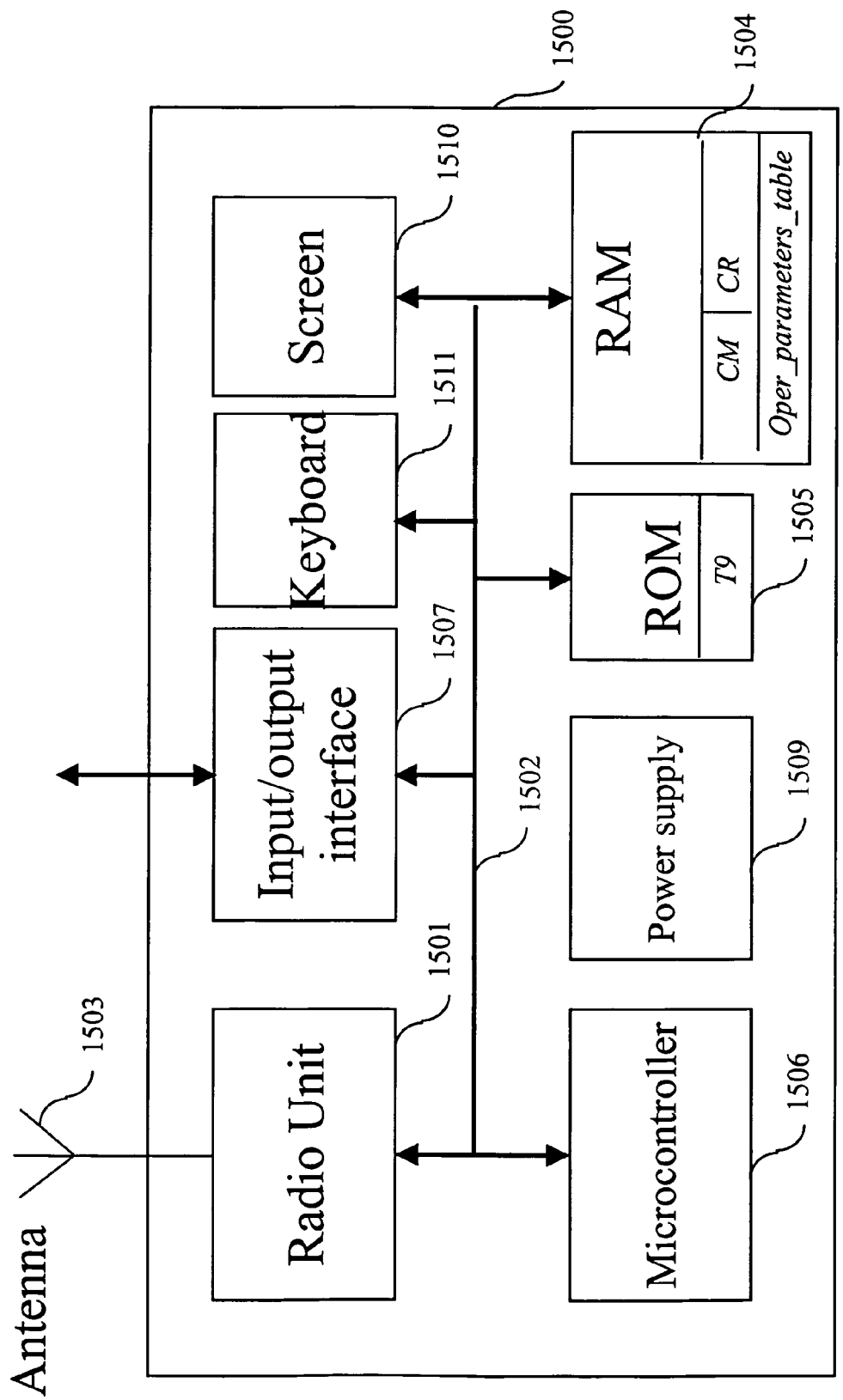
FIG. 15 depicts schematically the architecture of an electronic circuit incorporated in a destination station, in connection with the electronic circuit illustrated in FIG. 14.

FIG. 15 depicts the electronic circuit of a wireless communication device, using the DECT European standard (specified by the ETSI, ETS 300 175, 1991), functioning in mobile station mode.

This device can be either a DECT mobile station, or a DECT hybrid station. This communication device can be integrated into an item of equipment of the computer, printer, facsimile machine etc type or connected to one of the aforesaid items of equipment. The electronic circuit 1500 includes, connected together by an address and data bus 1502:

a radio unit 1501, provided with an antenna 1503,
an input/output controller 1507,
a central processing unit 1506,
a screen 1510,
a keyboard 1511,
a read only memory ROM 1505, and
a random access memory RAM 1504.

In addition, an electrical power supply 1509 is provided for supplying all the components of the electronic circuit 1500 (the electrical connections concerning the power supply 1509 are not shown).

The input/output controller 1507 is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 15 are well known to persons skilled in the art of communication circuits with a processor and more generally information processing circuits. They are therefore not detailed here. The electronic circuit 1500 and in particular the central unit 1506 are adapted to exploit all the capabilities of the DECT standard known up to the time of the present invention.

Figure 20:
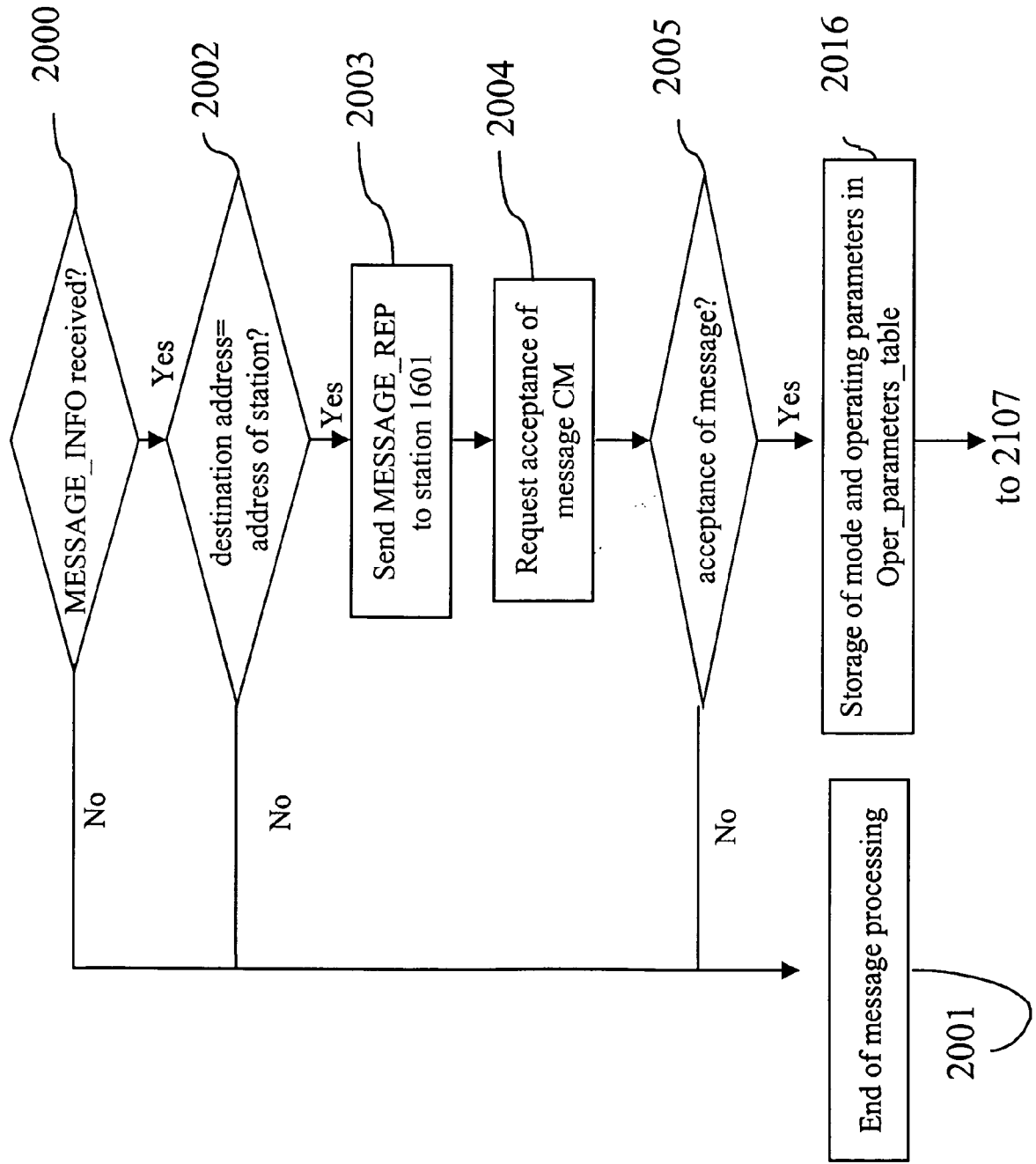
FIGS. 20 and 21 depict an algorithm executed by a destination station on reception of a message coming from a source which has implemented the algorithm illustrated in FIGS. 18 and 19.
Figure 21:
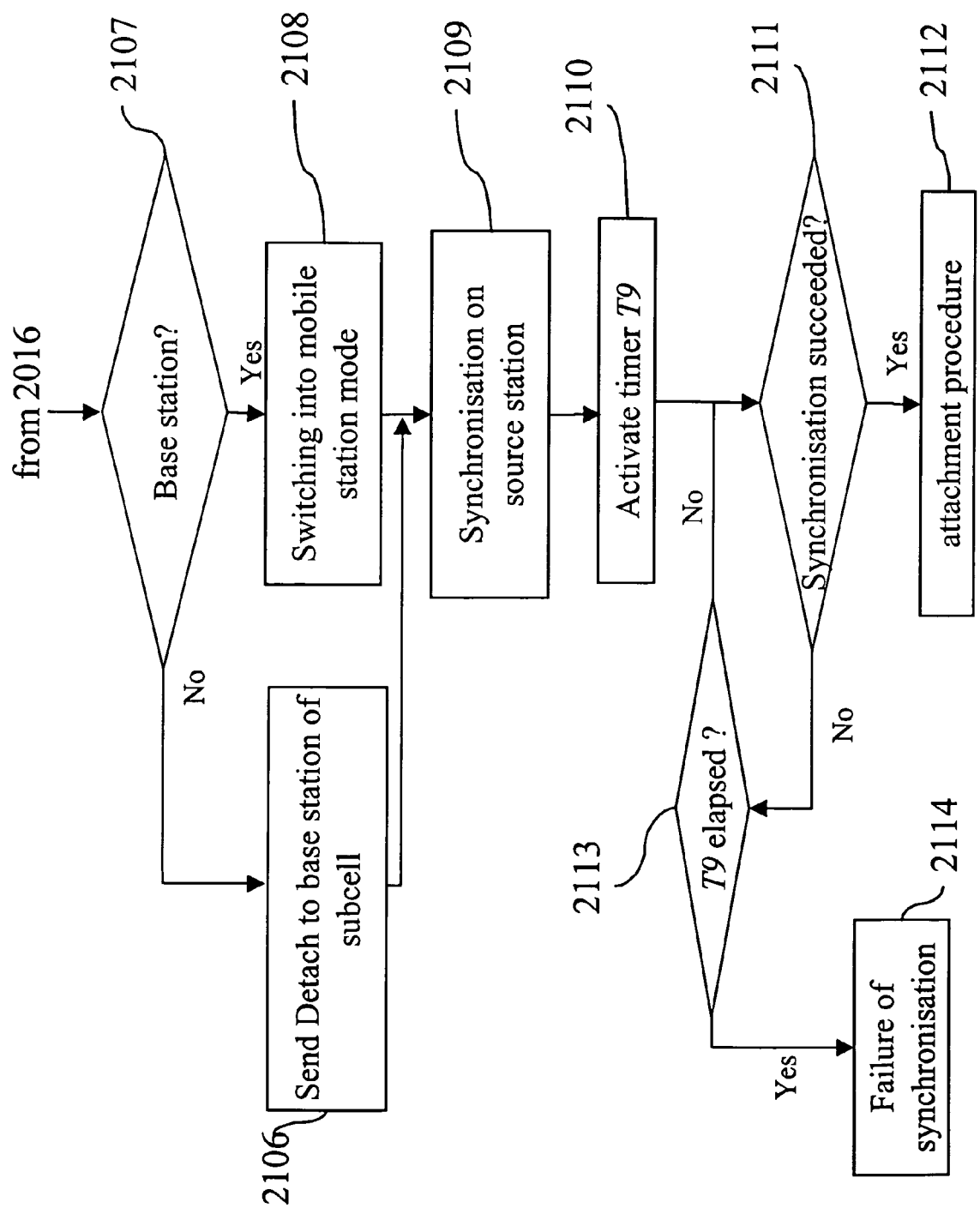

The central unit 1506 is also adapted to implement the method of the invention and, in particular, the flow diagrams illustrated in FIGS. 20 and 21.

The random access memory 1504 stores, in registers which, for convenience, each bear the same name as the data which they contain:

"Oper_parameters_table": table containing the operating parameters of the station, such as its operating mode (mobile station or base station), the identity of the base station with which it is synchronised, etc. This information makes it possible to preserve the operating state of the station before switching to a different operating mode, in order to be able to return to the previous operating mode, "CM": message field in which there is placed the content of a message received from a source station; and "CR": response field in which there is placed a response to be transmitted, in return, to a station which is the source of a received message.

The read only memory 1505 stores, in registers which, for convenience, each bear the same name as the data which they contain:

"T9": the value of the maximum period allowed for a station which is the destination of an information message to synchronise with the source station which has become the base station once again (see tests 2111 and 2113, FIG. 21). For example T9 is equal to 1 s.

The read only memory 1505 constitutes a means of storing information which can be read by a computer or a microprocessor, storing instructions of a computer program characterized in that it makes it possible to implement the method of the invention. According to a variant, the read only memory 1505 is removable, partially or totally, and includes, for example, a magnetic tape, a flash memory, a diskette or a fixed-memory compact disc (CD-ROM).

Figure 16:
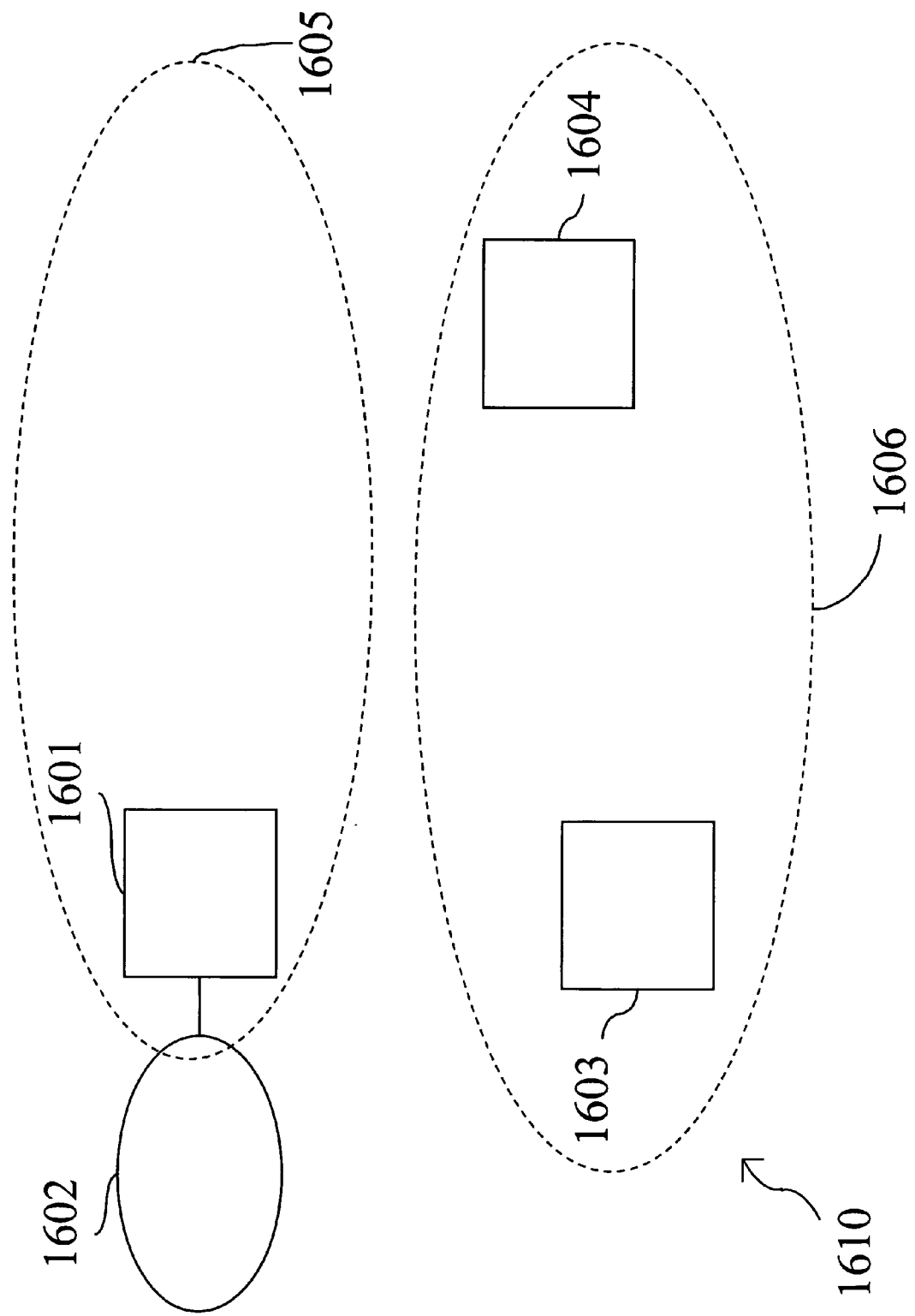
FIG. 16 depicts schematically a network implementing the present invention and including two communication stations functioning in base station mode, one of which is connected to an external network, and a communication station functioning in mobile station mode.

FIG. 16 depicts a local wireless communication network 1610 comprising:

a DECT base station 1601, connected to an STM network 1602, in a first subcell 1605, and two DECT stations 1603 and 1604 in a second subcell 1606.

On initialisation of this system, all the mobile stations illustrated in FIG. 16 are synchronised with the base station 1601.

In one embodiment of the present invention, if the mobile stations 1603 and 1604 wish to communicate together, the base station 1601 initiates a suitable procedure so that the stations 1603 and 1604 communicate directly, without transmitting data through the base station 1601. To this end, the base station 1601 sends a message to the hybrid station 1603, requesting it to switch into base station mode, and a message to the mobile station 1604, requesting it to synchronise on the base station 1603.

By virtue of this procedure, a new radio cell 1606 is created, which makes it possible to increase the radio passband available in the local wireless network.

The problem is that the stations 1603 and 1604 are no longer correctly synchronised with the base station 1601. Consequently, whilst the stations 1603 and 1604 constitute a subcell 1606 in the local wireless network, the station 1601 cannot communicate either with the station 1604 or with the station 1603.

The present invention allows to resolve this problem.

In particular, the present invention aims to transmit short messages (that is to say those which can be contained in the memory of a mobile station and, preferentially, whose transmission requires one or two radio frames), making it possible to transfer a command or an item of information from a first communication device to a second communication device, the first device and the second device being situated in radio cells situated in the same local area, but not being synchronised with each other, nor with the same station functioning in base station mode. The content of the short message can be either intended for the user of the destination station (equivalent to a short message known as SMS, standing for "short message system" in the GSM standard, the acronym for "Global System for Mobile communication", or intended for the central processing unit 1506 of the destination station.

The short messages thus transmitted have, for example, the following functions:

notifying the user of the station 1603 or 1604 of the arrival of an incoming call coming from the network to which the base station 1601 is connected (for example: a telephone call), notifying the user of the station 1603 or 1604 of the arrival of electronic mail, notifying the user of the station 1603 or 1604 of the arrival of a fax message (when the base station 1601 is integrated into a fax or connected to equipment of the fax type), notifying the stations 1603 and/or 1604 of the state of the base station 1601 (for example, notification solely of a free air interface). This is because it is the base station which switches in order to transmit the message. Thus, in this case the notification of a busy air interface might result in a rejection at step 1807 (communication underway in the cell). Only an indication of availability of the base (free air interface) seems possible, since thus there is a risk neither of cutting off a communication under way nor risk of rejection.

In FIG. 18 it can be seen that, during an operation 1801, the base station 1601 receives a message coming from the external network 1602 and intended for a so-called "destination" station 1604. Then, during an operation 1802, the base station 1601 seeks the location of the destination station 1604 by reading a location table stored in the random access memory 1404 (see FIGS. 17a and 17b).

This table contains:

at top left, the identifier of the station with which the station which stores the location table is synchronised, or its own identifier if this station functions in base station mode, here the identifier 1601, on a first column on the left, the identifiers of all the stations which are, at one moment or another, synchronised with this base station 1601, here the stations 1604 and 1603, in a second column, at the centre, the operating mode of the station identified at the head of each row, on the left, and in a third column, on the right, when the station identified at the head of the row is functioning in mobile station mode, the base station with which it is synchronised at the moment when the table is read; when the station identified at the head of the row is functioning in base station mode, the base station with which it was synchronised before switching to base station mode.

Thus, in FIG. 17a, which depicts the location table corresponding to a single cell, the two stations 1604 and 1603 are functioning in mobile station mode, the mode indicated by the letters "PP", the acronym of the words "portable part", in the central column and are all synchronised on the station functioning in base station mode 1601, indicated in the right-hand column.

The location table illustrated in FIG. 17b corresponds to the creation of the subcell 1606:

the station 1604 functions in mobile station mode synchronised with the station functioning in base station mode 1603, and the station 1603 functions in base station mode (represented by the letters "FP", the acronym of the words "fixed part", in the central column), the right-hand column then indicating that 1603 was previously synchronised with 1601, and that at the end of the existence of the subcell 1606, 1603 will attempt to resynchronise with the base station 1601.

On each modification of the configuration of the system, the base station 1601 updates its location table.

During a test 1803, the central unit 1406 determines whether or not the station 1604 is in the location table. When the result of test 1803 is negative, during an operation 1805, the call coming from the external network 1602 is rejected. When the result of test 1803 is positive, during a test 1804, the central unit 1406 determines whether or not the station 1604 is situated in the cell 1605, by determining whether or not, in the location table, in the row of the station 1604, the identifier of the base station 1601 is situated in the right-hand column.

When the result of the test 1804 is positive, during an operation 1806, the message intended for the station 1604 is transmitted to it within the cell 1605, according to known procedures in accordance with the DECT standard.

When the result of the test 1804 is negative, during a test 1807, the central unit 1406 determines whether or not there is a communication under way in the cell 1605. When the result of the test 1807 is positive, the call rejection operation 1805 is performed.

According to a variant, not shown, when the result of the test 1807 is positive, the central unit 1406 seeks, in the cell 1605, a station capable of functioning in base station mode and of ensuring the communications under way, and sends to it a request to change to base station mode. According to this variant, the station 1601 starts to function in mobile station mode if another station takes the role of base station, and then performs the operation 1808 (below).

When the result of the test 1807 is negative, during an operation 1808, the processing unit 1406 updates the variables "Base_parameters_table" and "External_message_table" stored in the random access memory 1404. The variable "Base_parameters_tab/e"contains all the information representing the state of the station 1601 before it switches to mobile station mode. Notably, "Base_parameters_table" stores all the databases related to the subscription parameters of the mobile stations which are registered with the base station 1601. The variable "External_message_table" contains all the information necessary to the station 1601 for it to be able to manage this call when it returns to base station mode. Notably, this table will make it possible to store whether there is a call waiting, the number of the person called and of the caller, etc.

Then, during an operation 1809, the station 1601 switches into mobile station operation mode.

Then, during an operation 1910 (FIG. 19), a clock pulse downcounter is initialised to a positive integer value and activated. Such a pulse downcounter is known as a "timer". Its value decreases by one, with each pulse of a clock or clock divider. The time T6 during which its value is positive is known in advance. When its value reaches "0", its operation is automatically stopped.

Next, during a test 1911, the central unit 1406 determines whether or not the station 1601 has synchronised with the base station 1603. When the result of the test 1911 is negative, during a test 1912, the central unit 1406 determines whether or not the value of the timer of duration T6 is nil.

When the result of the test 1912 is negative, the test 1911 is reiterated. When the result of the test 1912 is positive, during an operation 1917, station 1601 switches into base station mode and then, during an operation 1918, restores its base station mode operating parameters, as they were before the operation 1808, and sends, to the external network station which is at the origin of the call of the station 1604, a message representing failure to make immediate communication with the station 1604. Next, the operation 1805 is performed.

When the result of the test 1911 is positive, during an operation 1913, a message "MESSAGE_INFO" is transmitted to the mobile station 1604, with the field CM representing an external call, in accordance with the procedures known in the DECT standard. Then, during an operation 1914, a timer of duration T7 is initialised and started. Next, during a test 1915, the central unit 1406 determines whether or not a message "MESSAGE_REP" has been received coming from the mobile station 1604, with a field CR representing an acceptance of a call. When the result of the test 1915 is negative, during a test 1916, the central unit 1406 determines whether or not the value of the timer of duration T7 is nil.

When the result of the test 1916 is negative, the test 1915 is reiterated. When the result of the test 1916 is positive, the operation 1917 is performed. When the result of the test 1915 is positive, during a test 1920, the central unit 1406 determines whether or not the content of the response message represents an acceptance. When the result of the test 1920 is negative, the operation 1917 is performed. When the result of test 1920 is positive, during an operation 1919, a timer of predetermined duration T8 is initialised and activated. During the same operation 1919, the station 1601 returns to base station operating mode with the operating parameters stored in the random access memory 1404.

During the operation 1919, if the station 1604 does not synchronise with the base station 1601 during the duration of the timer, T8, the interlocutor at the origin of the message intended for the station 1604, on the network 1602, receives, from the station 1601, a message representing failure of the procedure to get into immediate communication with the station 1604.

For a non-urgent message, the timer is not activated during the operation 1919 since no response is awaited by the correspondent calling by means of the external network. This case applies in particular to notifications of reception of electronic messages (email) or faxes.

FIGS. 20 and 21 represent an algorithm executed by the station 1604 on reception of a message coming from the station 1601 using the algorithm illustrated in FIGS. 18 and 19. It should be noted here that the station 1603 uses the same algorithm when it is the called station.

During a test 2000, the central unit 1506 of the station 1604 determines whether or not a message of the "MESSAGE_INFO" type has been received. When the result of the test 2000 is negative, the processing of the message received is in accordance with the specifications of the DECT standard, during an operation 2001.

When the result of the test 2000 is positive, during a test 2002, the central unit 1506 determines whether or not the destination address of the message "MESSAGE_INFO" is the address of the station 1604. When the result of the test 2002 is negative, the operation 2001 is performed. When the result of the test 2002 is positive, during an operation 2003, the central unit 1506 sends a message "MESSAGE_REP" with the field CR representing an acceptance, to the station 1601. This acceptance means simply that the station 1604 has correctly received the message coming from the station 1601. The acceptance message is returned before the processing of the content of the message received, in order to enable the station 1601, as soon as possible, to return to base station mode.

Then, during an operation 2004, the central unit 1506 reads the message acceptance request including a content CM, a request which is contained in the message "MESSAGE_INFO". This is because, in the embodiment described and depicted, the message coming from the external network is a message whose content cannot be inserted in the message "MESSAGE_INFO", because of its size, and whose communication requires a passband such that it is necessary for a new cell to be created with solely the stations 1601 (operating in base station mode) and 1604 (operating in mobile station mode).

When the content of the message CM represents the arrival of a message in the form of electronic mail, the message is not accepted as an urgent message. In such a case, the terminal receiving the message signifies solely the correct reception of the message and is therefore not obliged to implement the succession of steps described in FIGS. 20 and 21.

Then, during a test 2005, the central unit 1506 determines whether or not the content message CM is accepted as an urgent message.

When the result of the test 2005 is negative, the operation 2001 is performed. When the result of the test 2005 is positive, during an operation 2016, the operating mode of the station 1604 is stored in random access memory 1504 and, in particular, the operating mode, base station or mobile station and, optionally, the identifier of the base station with which the station 1604 is synchronised.

Then, during a test 2107 (FIG. 21), the central unit 1506 determines whether or not the operating mode is that of base station. When the result is positive, during an operation 2108:

if no mobile station is synchronised with the base station 1604, the station 1604 switches into mobile station operating mode;

if at least one mobile station is synchronised with the base station 1604, the base station 1604 sends a request to change base station to one or all of the mobile stations in the cell 1606 (operation not shown in FIG. 21);

in all cases, the base station 1604 then switches into mobile station mode.

When the result of test 2107 is negative, during an operation 2106, the central unit 1506 causes to be sent, by the station 1604, a detachment message to the base station of the cell 1606, indicating to it that it is leaving the cell.

Following one of the operations 2106 or 2108, during an operation 2109, the central unit 1506 attempts to synchronise with the station which sent the message "MESSAGE_INFO" (the latter then functioning in base station mode).

Next, during an operation 2110, the central unit 1506 initialises a timer of predetermined duration T9 and activates it. Then, during a test 2111, the central unit 1506 determines whether or not the synchronisation with the station 1601 has been effected. When the result of the test 2111 is negative, during a test 2113, the central unit 1506 determines whether or not the value of the timer of duration T9 is nil. When the result of the test 2113 is negative, the test 2111 is reiterated. When the result of the test 2113 is positive, during an operation 2114, a synchronisation failure procedure is effected and the initial operating state of the station 1604, with its operating parameters stored in the random access memory 1504, is restored. In the event of failure of synchronisation with the base station with which the station 1604 was, if applicable, initially synchronised, or in the event of the presence of a new base station, the station 1604 synchronises with any base station present.

When the result of test 2111 is positive, during an operation 2112, the central unit 1506 causes the attachment of the station 1604 with the station 1601. Next, the cell which includes solely the stations 1601 and 1604 is created and communication is established.

Figure 22:
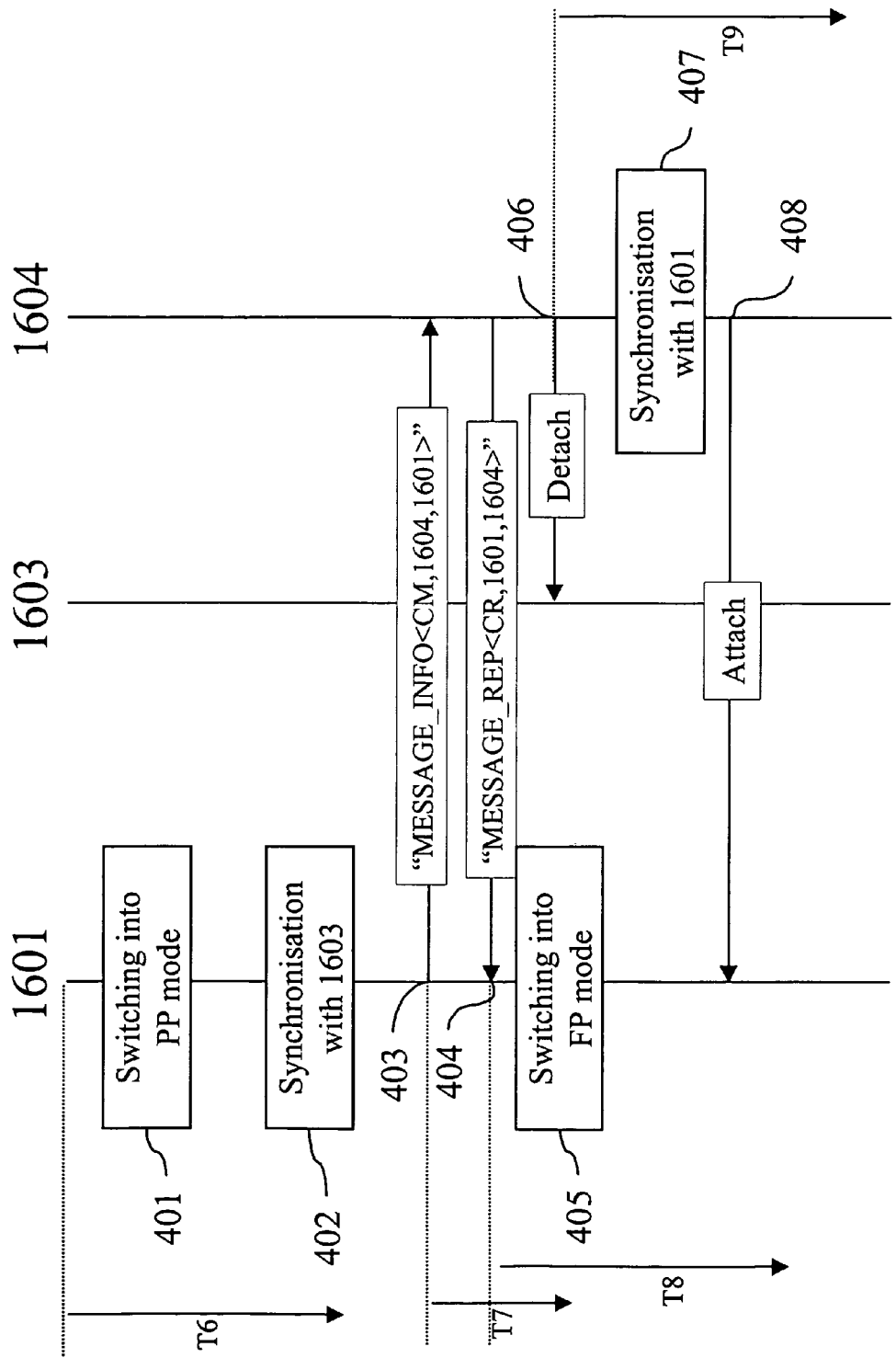
FIG. 22 depicts a succession of radio messages for transmitting a message between two stations implementing respectively the algorithms illustrated in FIGS. 18 and 19 on the one hand and 20 and 21 on the other hand.

In FIG. 22, there can be seen, for the three stations 1601, 1603 and 1604, shown in vertical continuous lines, the transmissions and receptions of messages.

The elapse of time is depicted from top to bottom, each duration of a timer being depicted by a segment of a vertical straight line.

Only the messages sent when a message is transmitted from the station 1601 to the station 1604 is a success and when the station 1604 attaches to the station 1601 are shown, along with certain operations performed by the stations 1601 and 1604.

Following the switching of the station 1601 into mobile station mode, operation 401 (operation 1809, FIG. 18), the station 1601 performs an operation of synchronisation with the station 1603, during an operation 402 (operation 1911, FIG. 19). Then the station 1601 sends, by means of the base station 1603, a message "MESSAGE_INFO <CM, 1604, 1601>", in which the first term includes the content of the message, the second identifier of the message destination station and the third identifier of the message source station, during an operation 403 (operations 1913, FIG. 19, and 2000, FIG. 20).

In response, the mobile station 1604 returns to the station 1601, by means of the base station 1603, a message "MESSAGE_REP<CR, 1601, 1604>, in which the first term represents the content of the response, the second the station which is the destination of the response and the third the station which was the source of the response, during an operation 404 (operations 2003, FIG. 20, and 1915, FIG. 19).

Next, at the same time, the station 1604 sends a detachment message 406 (operation 2106, FIG. 21) to the base station 1603, and the station 1601 switches into base station mode (operation 1919, FIG. 19).

Next, the mobile station 1604 synchronises with the base station 1601 during an operation 407 (operations 2109 to 2111 and 2113, FIG. 21). Finally, the mobile station 1604 sends a signal of attachment to the base station 1601, during an operation 408 (operation 2112, FIG. 21).

Next, during an operation which is not shown, the mobile station 1604 communicates at a distance, over the external network, by means of the base station 1601.

According to a variant, when the destination station is a station which is functioning in base station mode, the synchronisation operation includes an operation of switching the destination station into mobile mode and an operation of attachment with the source station 1601.

Figure 23:
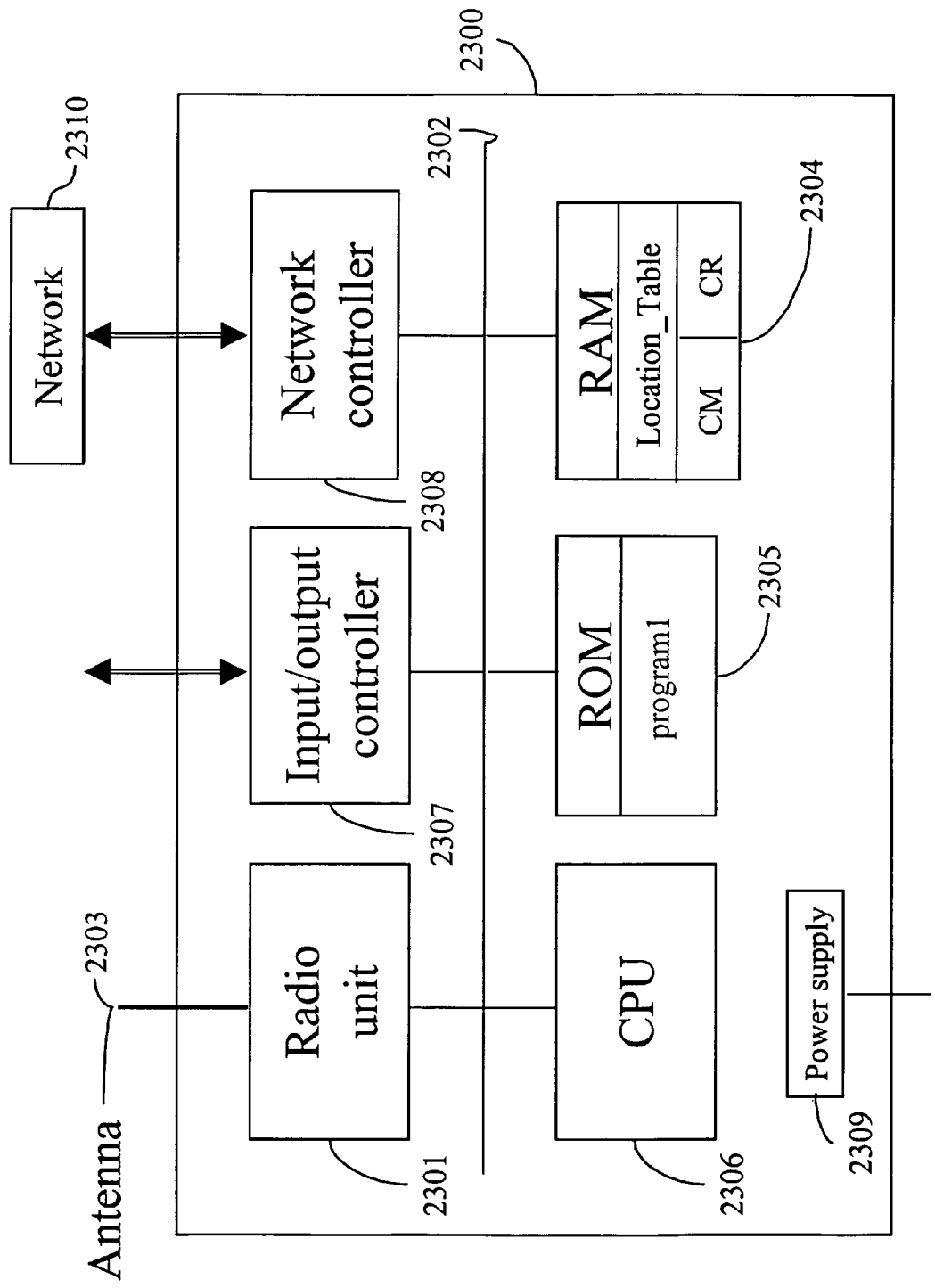
FIG. 23 depicts schematically the architecture of an electronic circuit incorporated in a communication device in accordance with the eleventh and twelfth aspects of the present invention and adapted to function in base station mode.

FIG. 23 depicts the electronic circuit of a wireless communication device, using the DECT European standard (specified by the ETSI, ETS 300 175, 1991), which can be connected to a network of the STN (Switched Telecommunication Network), Ethernet etc type.

This device can be either a DECT base station, or a DECT hybrid station. A DECT base station is responsible notably for providing the synchronisation of the system. A hybrid station is a communication station which can alternately operate as a base station or as a mobile station. This communication device can be integrated into equipment of the computer, printer, fax etc type or be connected to one of the above mentioned items of equipment. The electronic circuit 2300 includes, connected together by an address and data bus 2302:

a radio unit 2301, provided with an antenna 2303,
an input/output controller 2307,
a network controller 2308,
a central processing unit 2306,
a read only memory ROM 2305, and
a random access memory RAM 2304.

In addition, an electrical power supply 2309 is provided for powering all the components of the electronic circuit 2300 (the electrical connections concerning the power supply 2309 are not shown).

The network controller 2308 manages the interface with an external network 2310, for example of the switched telephone network type.

The input/output controller is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 23 are well known to persons skilled in the art of communication circuits with a processor and more generally information processing circuits. They are therefore not detailed here. The electronic circuit 2300 and in particular the central unit 2306 are adapted to exploit all the capabilities of the DECT standard known up to the time of the present invention.

Figure 32:
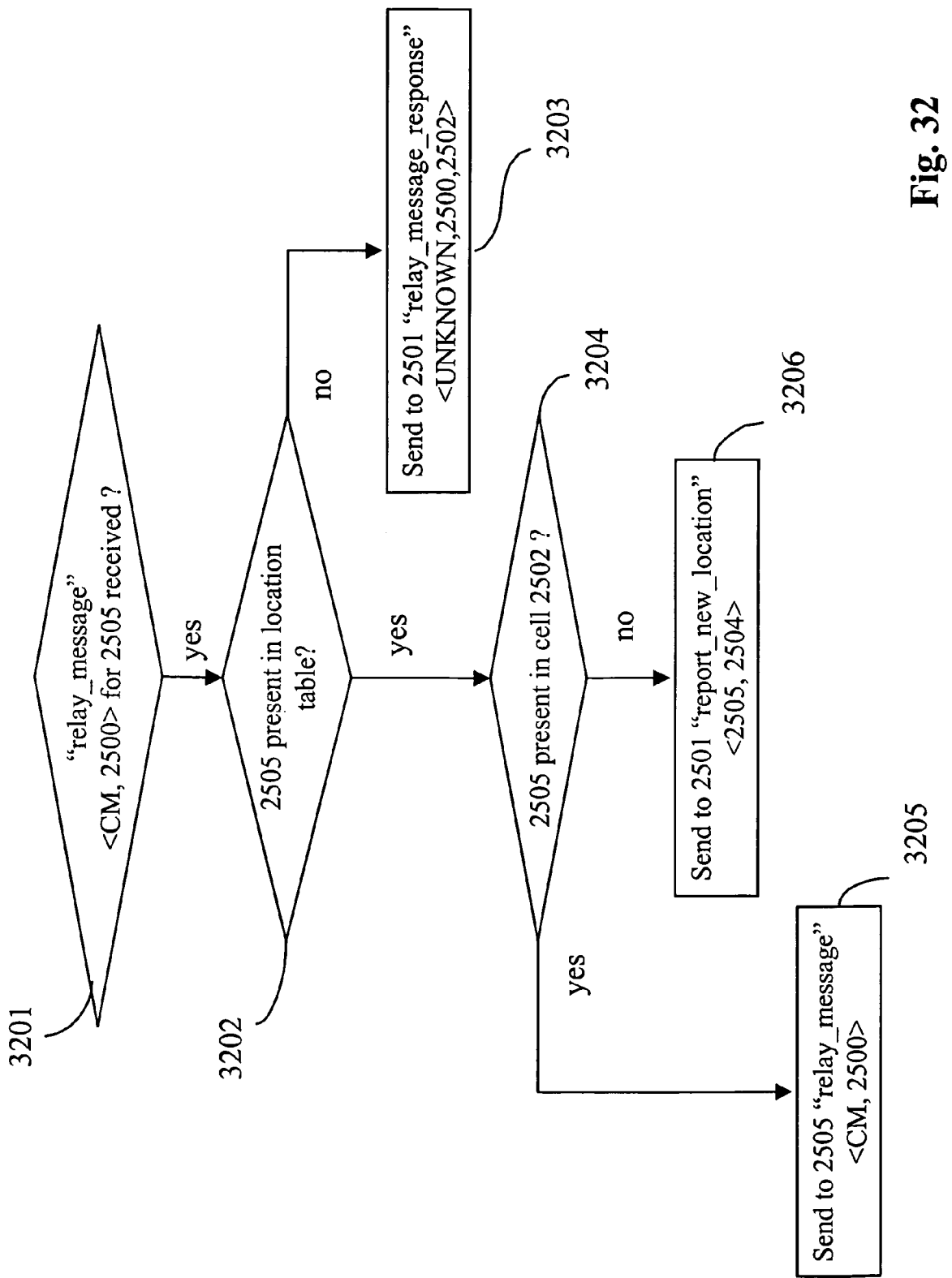
FIG. 32 depicts the algorithm executed by a base station which has received a message giving information on a station serving as a relay.

The central unit 2306 is also adapted to implement the method of the invention and, in particular, the flow diagram illustrated in FIG. 32.

The random access memory 2304 stores, in registers which, for convenience, each bear the same name as the data which they contain:

"Location_Table": a table containing the data concerning the location of the stations in the system;

"CM": message field; and

"CR": response field.

The read only memory 2305 stores, in registers which, for convenience, each bear the same name as the data which they contain:

"program1" in which there is stored the operating program of the central unit 2306.

The read only memory 2305 constitutes a means of storing information which can be read by a computer or a microprocessor, storing instructions of a computer program characterized in that it makes it possible to implement the method of the invention. According to a variant, the read only memory 2305 is removable, partially or totally, and has, for example, a magnetic tape, a flash memory, a diskette or a fixed-memory compact disc (CD-ROM).

Figure 24:
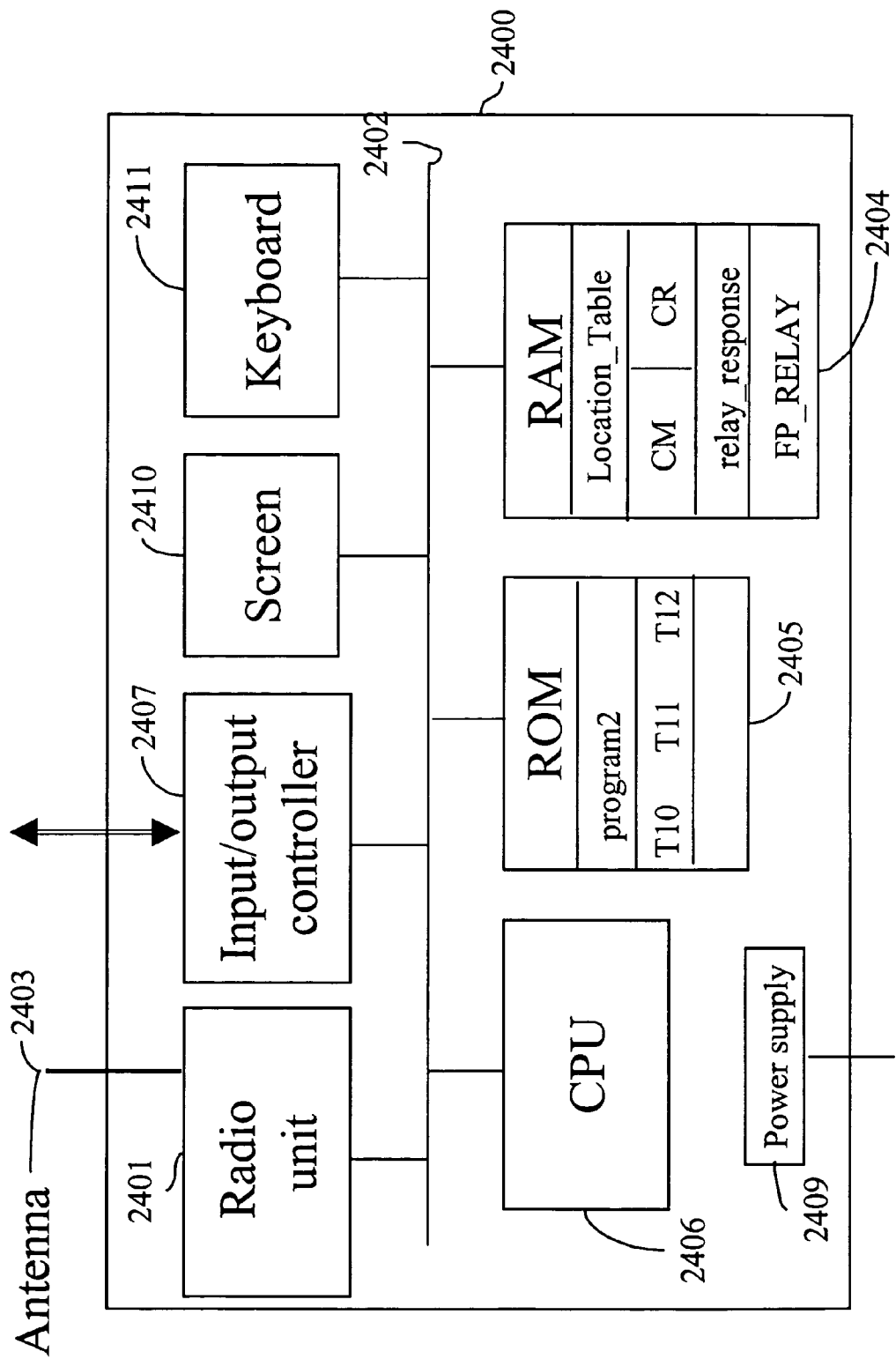
FIG. 24 depicts schematically the architecture of an electronic circuit incorporated in a communication device in accordance with the eleventh and twelfth aspects of the present invention and adapted to function in mobile station mode, in connection with the electronic circuit in FIG. 23, FIGS. 25 and 26 depict examples of a network configuration for which the present invention offers a particular advantage.

FIG. 24 depicts the electronic circuit of a wireless communication device, using the DECT European standard (specified by the ETSI, ETS 300 175, 1991), functioning in mobile station mode.

This device can be either a DECT mobile station, or a DECT hybrid station. This communication device can be integrated into an item of equipment of the computer, printer, facsimile machine etc type or connected to one of the aforesaid items of equipment. The electronic circuit 2400 includes, connected together by an address and data bus 2402:

a radio unit 2401, provided with an antenna 2403, an input/output controller 2407, a central processing unit 2406, a screen 2410, a keyboard 2411, a read only memory ROM 2405, and a random access memory RAM 2404.

In addition, an electrical power supply 2409 is provided for supplying all the components of the electronic circuit 2400 (the electrical connections concerning the power supply 2409 are not shown).

The input/output controller 2407 is connected to an information source (for example an image, sound, text or graphics sensor, a telephone, a facsimile machine, a photographic apparatus, a video camera, a camcorder etc) and/or to an information destination (for example a television receiver, a monitor, a music system, a telephone, a facsimile machine, a video recorder etc).

All the components illustrated in FIG. 24 are well known to persons skilled in the art of communication circuits with a processor and more generally information processing circuits. They are therefore not detailed here. The electronic circuit 2400 and in particular the central unit 2406 are adapted to exploit all the capabilities of the DECT standard known up to the time of the present invention.

Figure 29:
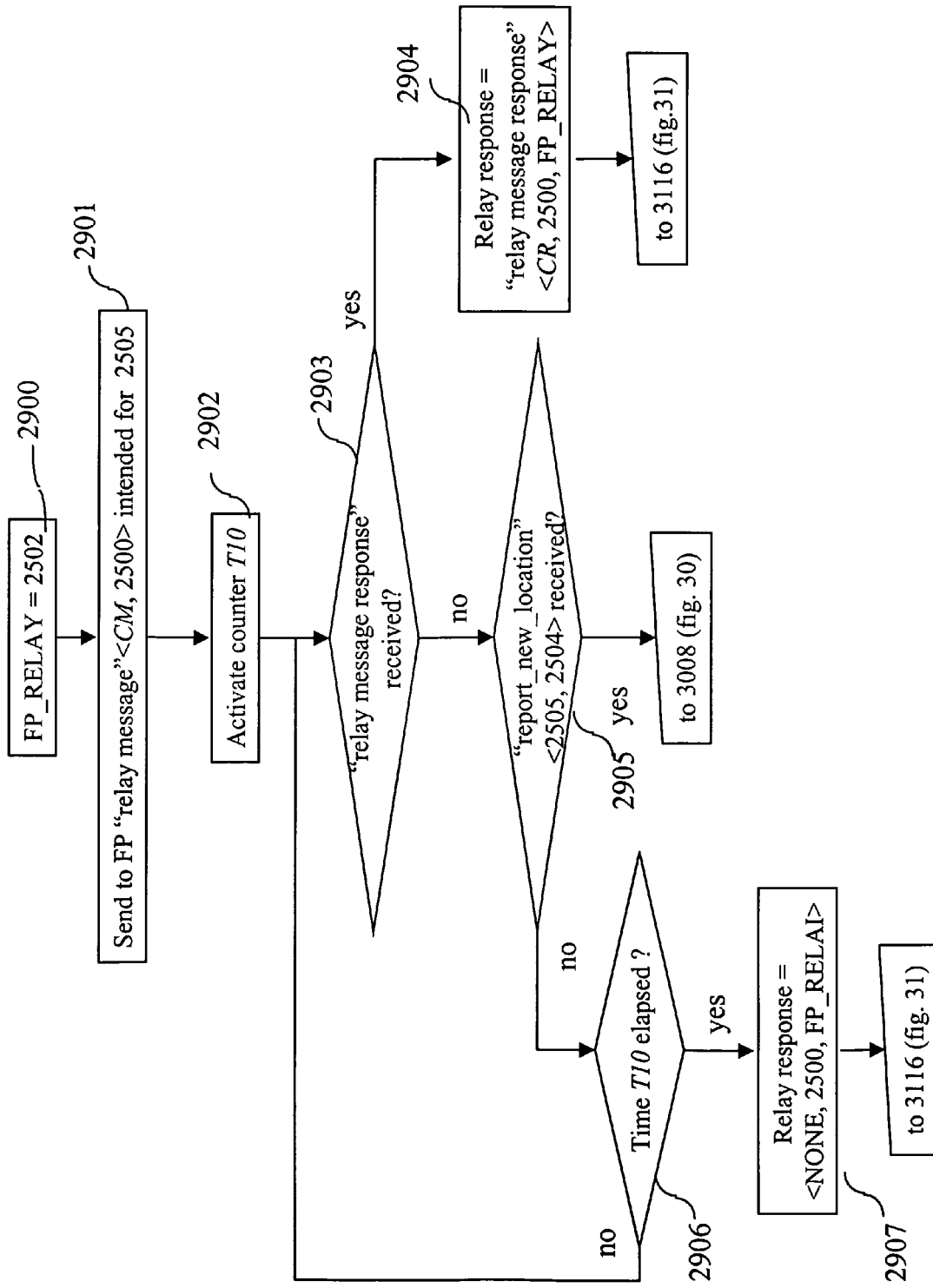
FIG. 29 depicts an algorithm executed by a relay mobile station which sends a relay message to a communication station which is not synchronised with the source of said message.
Figure 30:
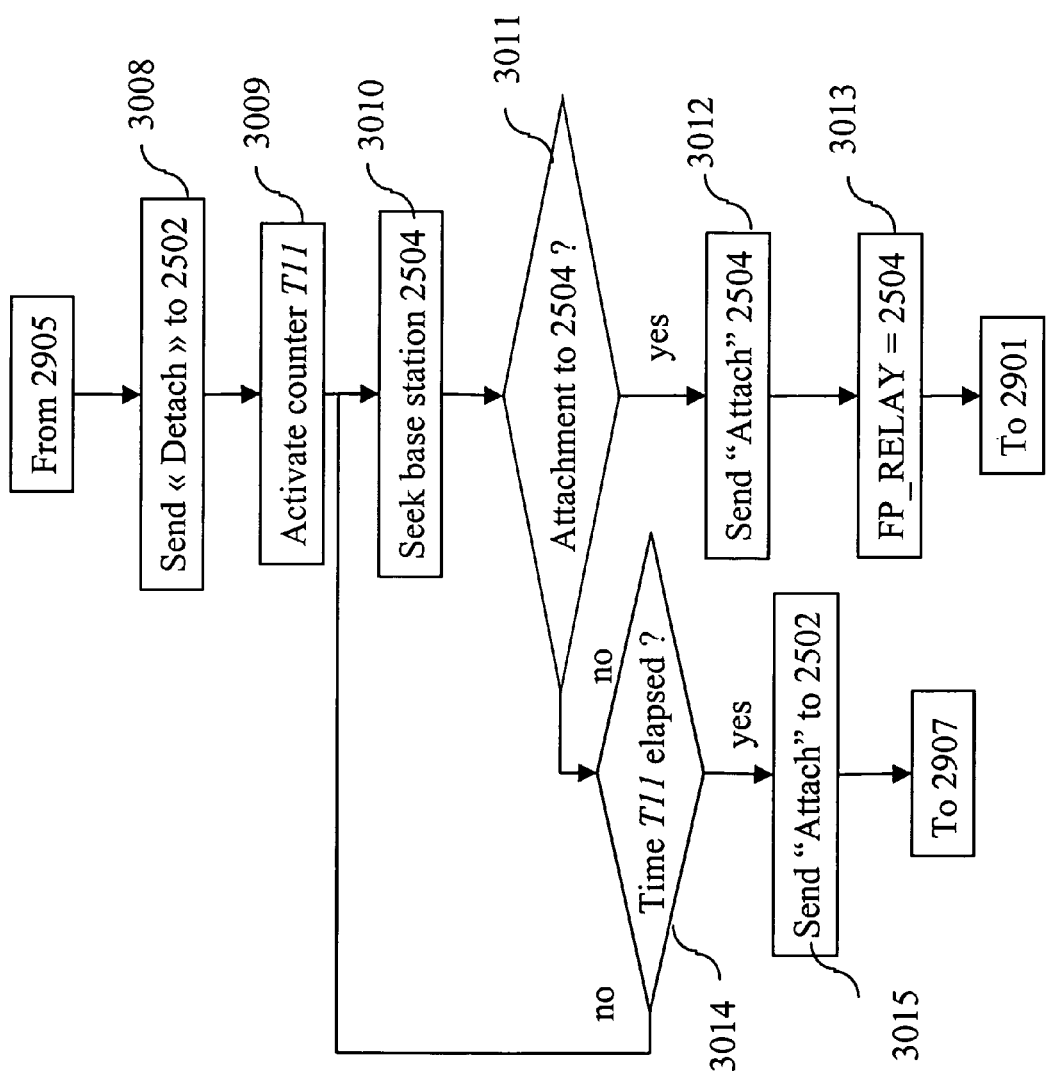
FIG. 30 depicts an algorithm executed by a relay mobile station which has received a new location information message.
Figure 31:
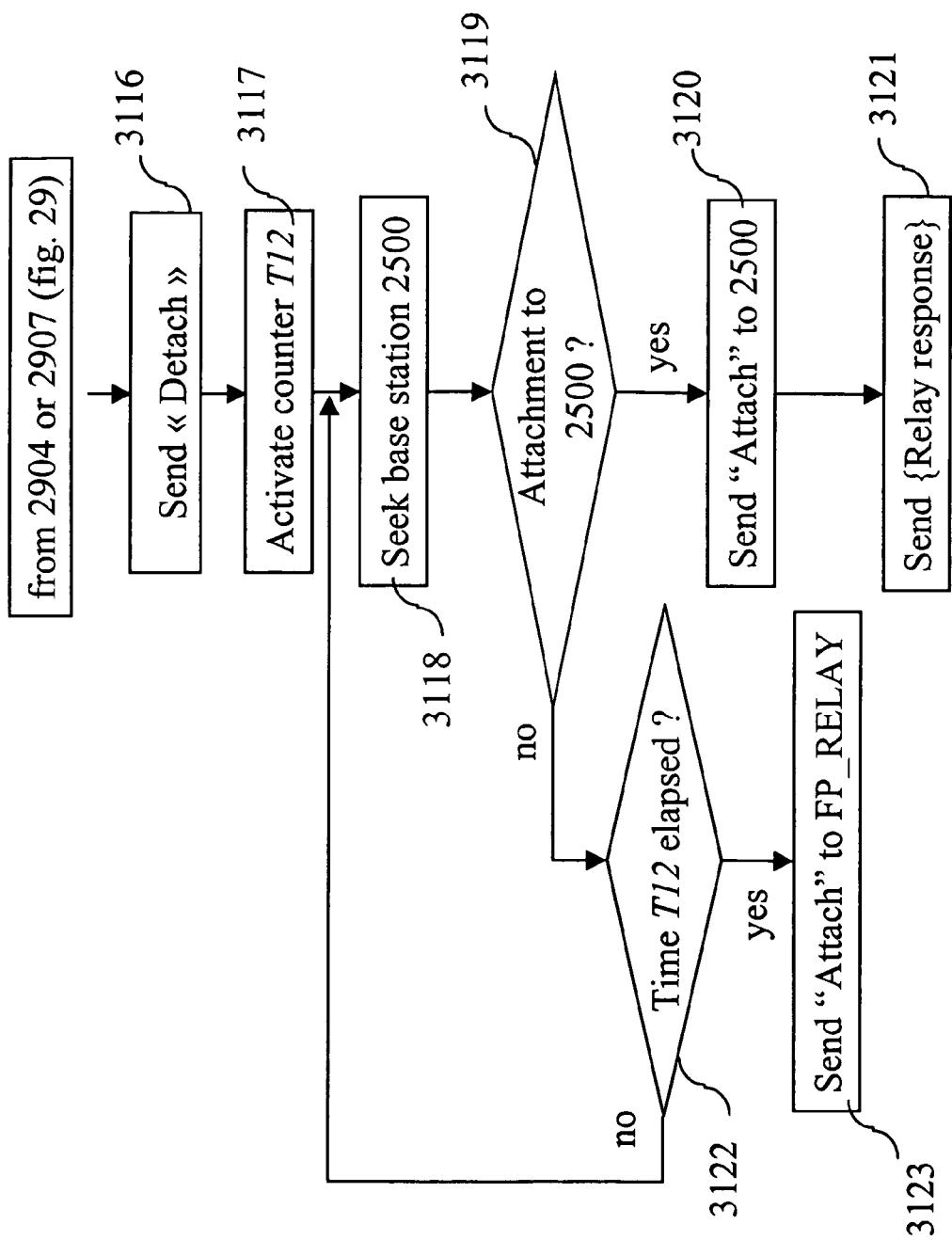
FIG. 31 depicts an algorithm executed by a relay mobile station resynchronising with the initial base station.

The central unit 2406 is also adapted to implement the method of the invention and, in particular, the flow diagrams illustrated in FIGS. 29, 30 and 31.

The random access memory 2404 stores, in registers which, for convenience, each bear the same name as the data which they contain:

"relay_response": a variable containing a message of the type "relay_message_response"

"FP_RELAY": a variable containing the identity of the base station, with which a relay mobile station must synchronise in order to transmit a message of the "relay-message" type;

"CM": message field;

"CR": response field; and

"Location_table": a table containing the data representing the location of the stations in the system.

The read only memory 2405 stores, in registers which, for convenience, each bear the same name as the data which they contain:

"program2" in which there is stored the operating program of the central unit 2406, "T10": the maximum value of the waiting time between the sending of a message "relay_message" and the reception of the response either of the "relay_message_response" type or "report_new_location", for example 1 second.

"T11": maximum value of the time for seeking synchronisation to a new base station, for example 500 milliseconds, and "T12": the maximum value of the time for seeking synchronisation to the initial base station, for example 500 milliseconds.

The read only memory 2405 constitutes a means of storing information which can be read by a computer or a microprocessor, storing instructions of a computer program characterized in that it makes it possible to implement the method of the invention. According to a variant, the read only memory 2405 is removable, partially or totally, and includes, for example, a magnetic tape, a flash memory, a diskette or a fixed-memory compact disc (CD-ROM).

Figure 25:
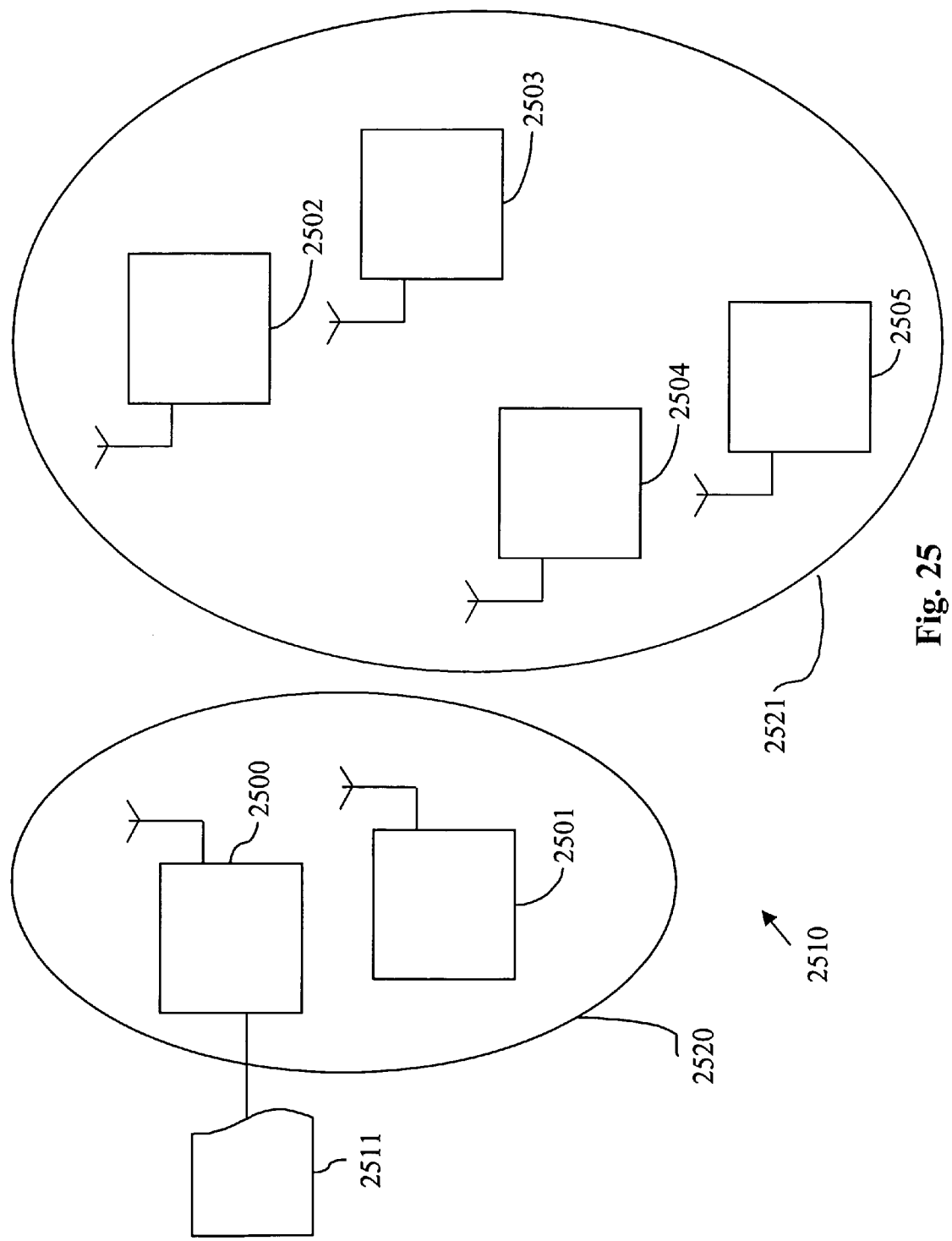

FIG. 25 depicts a local wireless communication network 2510 comprising:

a first cell 2520 including:

a DECT base station 2500, connected to an STN network 2511, and a mobile station 2501; and a second cell 2521 including:

a base station 2502, a mobile station 2503, a hybrid station 2504 functioning initially in mobile station mode, and a mobile station 2505.

On initialisation of this system, the mobile station 2501 is synchronised with the base station 2500 and the mobile stations 2503, 2504 and 2505 are synchronised with the base station 2502.

In one embodiment of the present invention, if the mobile stations 2504 and 2505 wish to communicate together, the base station 2502 initiates a suitable procedure so that the stations 2504 and 2505 communicate directly, without transmitting data through the base station 2502. To this end, the base station 2502 sends a message to the hybrid station 2504, requesting it to switch into base station mode, and a message to the mobile station 2505 requesting it to synchronise on the station 2504.

By virtue of this procedure, two new radio cells 2622 and 2623 are created (FIG. 26), which makes it possible to increase the radio passband available in the local wireless network.

The location table of the base station 2500, in the configuration illustrated in FIG. 25, contains the following information:

| Identifier | Operating mode | Last attachment station |
|---|---|---|
| 2500 | Base | 2500 |
| 2501 | Mobile | 2500 |
| 2502 | Base | 2500 |
| 2503 | Mobile | 2502 |
| 2504 | Mobile | 2502 |
| 2505 | Mobile | 2502 |

The location table of the base station 2502, in the configuration illustrated in FIG. 25, contains the following information:

| Identifier | Operating mode | Last attachment station |
|---|---|---|
| 2500 | Base | unknown |
| 2501 | Mobile | unknown |
| 2502 | Base | 2500 |
| 2503 | Mobile | 2502 |
| 2504 | Mobile | 2502 |
| 2505 | Mobile | 2502 |

Figure 26:
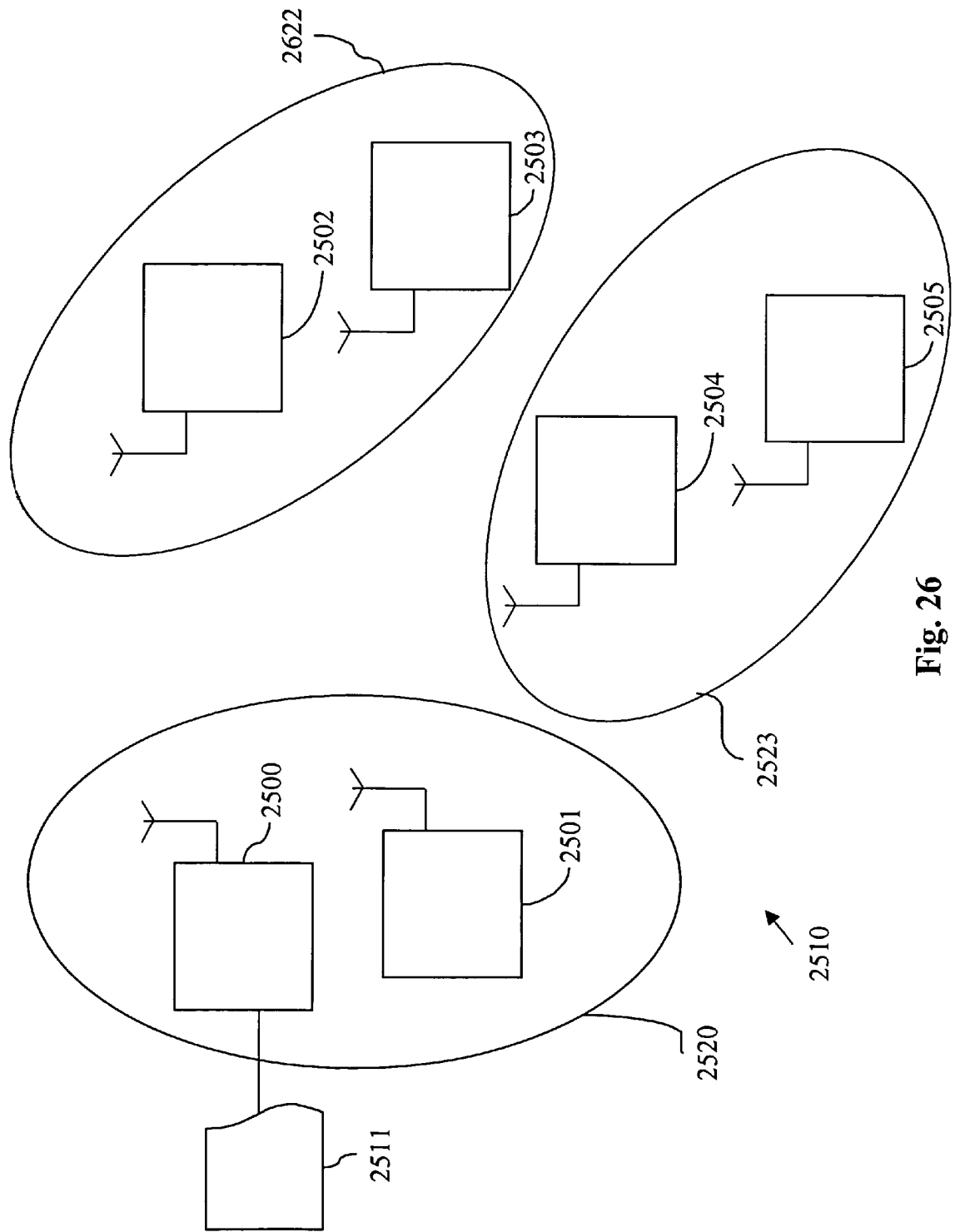

The location table of the base station 2500, in the configuration illustrated in FIG. 26, contains the following information:

| Identifier | Operating mode | Last attachment station |
|---|---|---|
| 2500 | Base | 2500 |
| 2501 | Mobile | 2500 |
| 2502 | Base | 2500 |
| 2503 | Mobile | 2502 |
| 2504 | Mobile | 2502 |
| 2505 | Mobile | 2502 |

The location table of the base station 2502, in the configuration illustrated in FIG. 26, contains the following information:

| Identifier | Operating mode | Last attachment station |
|---|---|---|
| 2500 | Base | unknown |
| 2501 | Mobile | unknown |
| 2502 | Base | 2500 |
| 2503 | Mobile | 2502 |
| 2504 | Base | 2502 |
| 2505 | Mobile | 2504 |

The location table of the base station 2504, in the configuration illustrated in FIG. 26, contains the following information:

| Identifier | Operating mode | Last attachment station |
|---|---|---|
| 2500 | Base | unknown |
| 2501 | Mobile | unknown |
| 2502 | Base | unknown |
| 2503 | Mobile | unknown |
| 2504 | Base | 2502 |
| 2505 | Mobile | 2504 |

It can be seen that, in the configuration illustrated in FIG. 26, the location table of the base station 2500 is incorrect with regard to the stations 2504 and 2505.

Under these circumstances, if the base station 2500 wishes to send a message to a mobile station 2505, it should send it to the cell consisting of the stations 2504 and 2505 and not, as indicated in its location table, to the cell containing the base station 2502.

This error may be the source of delay in transmission and, when the response times are fixed by timers, may result in failures to connect. In particular, when a communication is to be established between the STN switched network 2511 and one of the stations 2504 or 2505, the information for the latter station may reach it too late for the communication to be able to be established.

The present invention sets out to remedy these drawbacks.

Figure 27:
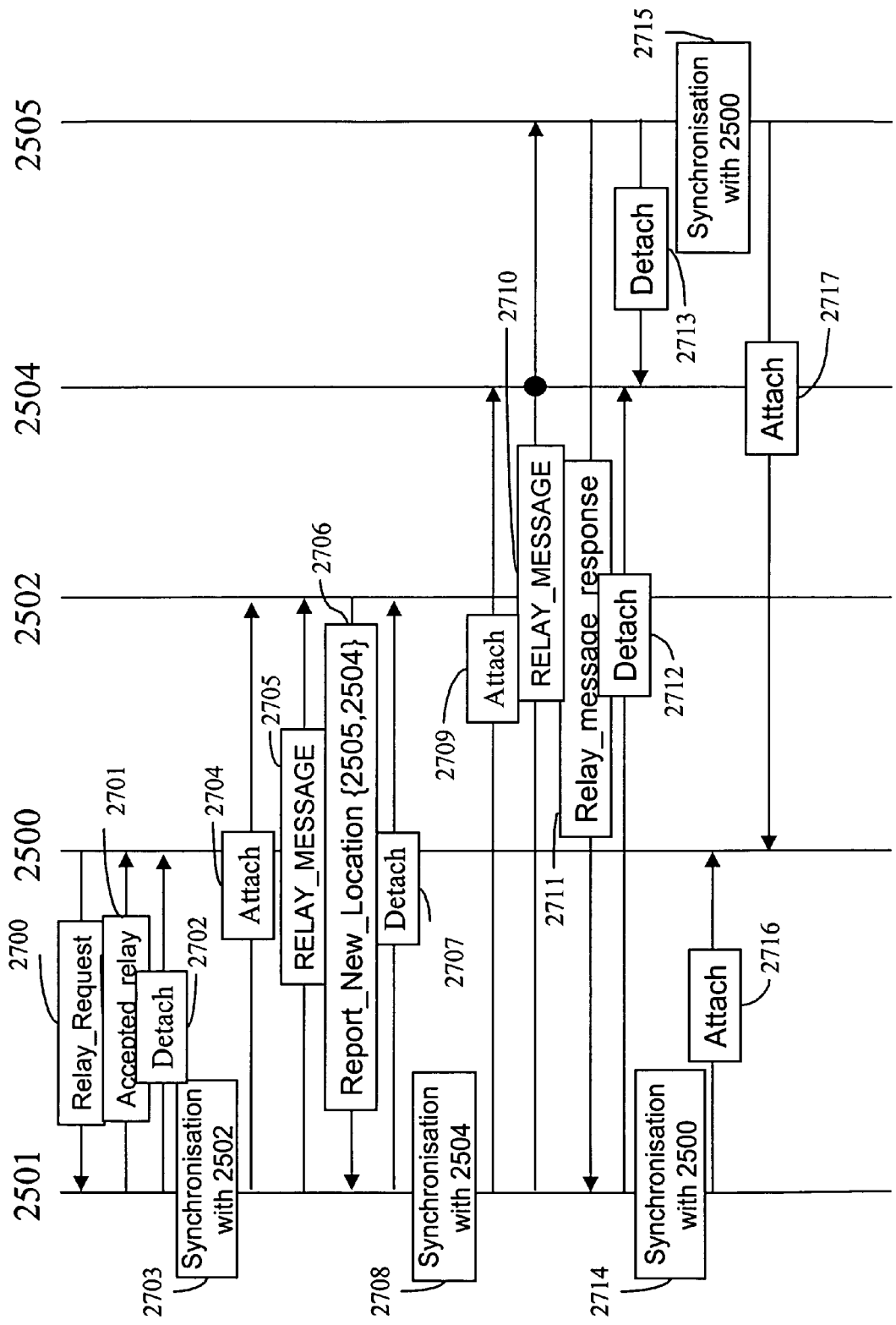
FIG. 27 depicts a succession of message transmissions in accordance with the present invention, in a first embodiment.
Figure 28:
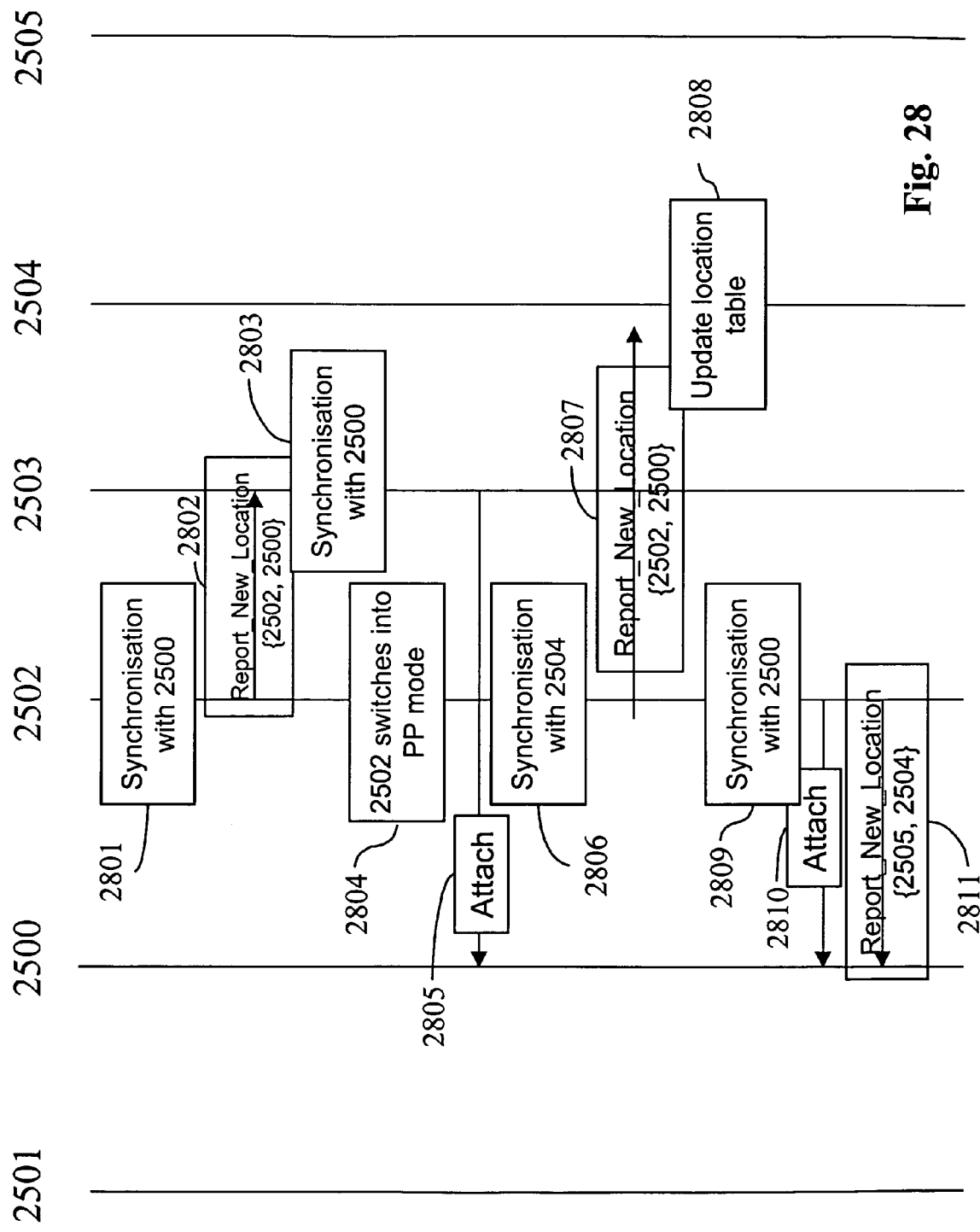
FIG. 28 depicts a succession of message transmissions in accordance with the present invention, in a second embodiment.

In order to illustrate various embodiments of the present invention, two cases are set out with regard to FIGS. 27 and 28:

FIG. 27 depicts the case where the base station 2500 receives a message for the station 2505, in the configuration illustrated in FIG. 26, and FIG. 28 depicts the case where the base station 2500 receives a message for the station 2502, in the configuration illustrated in FIG. 26.

In FIG. 27, there can be seen, on five vertical lines, events, the sending or receiving of messages internal to the DECT network, which occur at the stations 2501, 2500, 2502, 2504 and 2505 (in order from left to right). The chronological order is complied with in the downward vertical direction, the first events thus being shown at the top in FIG. 27.

First of all, the base station 2500 sends to the mobile station 2501 a message "relay_request" 2700, which represents a request for the transmission, by the station 2501, of a message intended for the station 2505, in the cell where the station 2505 is situated, according to the location table stored by the base station 2500.

In the example described, the message "relay_request" represents information according to which a communication coming from the STN network 2511 is intended for the mobile station 2505.

In accordance with the location table stored by the base station 2500, the cell in question is the one where the base station is the station 2502.

In response to the message 2700, the mobile station 2501 sends, to the base station 2500, a message "accept_relay" 2701 accepting or refusing transmission of a message to the station 2505. Here this message 2701 is an acceptance message.

Then the mobile station 2501 sends, to the base station 2500, a detachment message "detach" 2702 to indicate to the base station 2500 that the mobile station 2501 is desynchronising from the base station 2500 and that it is therefore no longer able to communicate with the base station 2500 nor with the mobile stations which are synchronised with the base station 2500.

Next, the station 2501 performs an operation 2703 of seeking the base station 2502, that is to say seeking a synchronisation signal transmitted by the base station 2502.

Then, as soon as this synchronisation signal has been found, the mobile station 2501 sends, to the base station 2502, an attachment signal 2704 "attach" in order to indicate to it that it is synchronising with the base station 2502 and that it is able to communicate with the base station 2502 and/or with any mobile stations which are also synchronised with the base station 2502.

Next, the mobile station 2501 sends, to the mobile station 2505, a signal 2705 "relay_message" in order to transmit to it the message transmitted to it by the base station 2500.

The base station 2502, which is to transmit this message to the mobile station 2505, compares the identifier of the destination of this message, here 2505, with its location table and determines that the mobile station 2505 is not synchronised with the base station 2502.

The base station 2502 then transmits, to the mobile station 2501, a message 2706 "report_new_location{2505, 2504}" in which the first identifier, here 2505, represents the mobile station sought and the second identifier, here 2504, represents the base station with which the mobile station sought is synchronised.

The mobile station 2501 then transmits, to the station 2502, a detachment message "detach" 2707 in order to indicate to the base station 2502 that the mobile station 2501 is desynchronising from the base station 2502 and that it is therefore no longer able to communicate with the base station 2502 nor with the mobile stations which are synchronised with the base station 2502.

Next, the station 2501 performs an operation 2708 of seeking the base station 2504, that is to say seeking a synchronisation signal transmitted by the base station 2504.

Then, as soon as this synchronisation signal has been found, the mobile station 2501 sends, to the base station 2504, an attachment signal 2709 "attach" in order to indicate to it that it is synchronising with the base station 2504 and that it is able to communicate with the base station 2504 and/or with any mobile stations which are also synchronised with the base station 2504.

Next, the mobile station 2501 sends, to the mobile station 2505, a signal 2710 "relay_message" in order to transmit to it the message transmitted to it by the base station 2500.

In response, the mobile station 2505 transmits, to the mobile station 2501, a signal 2711 "relay_message_response" which responds to the message 2710. In the case depicted, this message 2711 represents an acceptance of establishment of communication with the STN network 2511, by means of the base station 2500.

Next, each of the mobile stations 2501 and 2505 sends a detachment message "detach", 2712 and 2713 respectively, to the base station 2504.

Then the mobile stations 2501 and 2505 perform operations 2714 and 2715, respectively, of seeking the base station 2500, that is to say seeking a synchronisation signal transmitted by the base station 2500.

Finally, each of the mobile stations 2501 and 2505 transmits an attachment message "attach", 2716 and 2717 respectively, to the base station 2500.

The mobile station 2505 next enters into communication with the STN network 2511, by means of the base station 2500.

FIG. 28 depicts the events which follow on from the transmission, by the base station 2500, to the base station 2502, of a message informing the base station 2502 that a communication coming from the STN network 2511 is intended for the base station 2502.

It can be seen, with the same representation conventions as with FIG. 27, that the base station 2502 decides to get into communication with the STN network 2511, operation 2801. Then the base station 2502 sends, to the mobile station 2503, a message 2802 "report_new_location{2502, 2500}" in which the first identifier, here 2502, represents the station which is sending the message and the second identifier 2500 represents the base station with which the base station 2502 will synchronise.

On reception of this message 2802, the mobile station 2503 performs an operation 2803 of seeking the base station 2500, that is to say seeking a synchronisation signal sent by the base station 2500.

The base station 2502 then switches into mobile station operating mode, during an operation 2804, and the mobile station 2503 sends, to the base station 2500, an attachment signal "attach" 2805.

By reading the location table which it stores, the mobile station 2502 determines whether the stations which are represented therein have the following two characteristics:

they are operating in base station mode, and the previous base station to which they were attached is the station 2502.

For each of the stations which meet these two characteristics (here only the base station 2504 is situated in this case), the mobile station 2502 performs an operation 2806 of seeking the base station 2504, that is to say seeking a synchronisation signal transmitted by the base station 2504.

The mobile station 2502 sends, to the base station 2504, an attachment signal "attach", not shown, then a message 2807 "report_new_location{2502,2500}" in which the first identifier represents the station which is sending the message and the second identifier represents the base station with which the station in question (the station 2502) will synchronise.

The base station 2504 then performs an operation 2808 of updating its location table, replacing this information, for all the stations which have the station 2502 as the last base station with which they were synchronised, with the base station to which the station in question (here the station 2502) will synchronise (here the base station 2500).

Then the mobile station 2502 performs an operation 2809 of seeking the base station 2500, that is to say seeking a synchronisation signal transmitted by the base station 2500.

The mobile station 2502 sends, to the base station 2500, an attachment signal "attach" 2810.

Finally, the mobile station 2502 sends, to the base station 2500, a message 2811 "report_new_location{2505,2504}" in which:

the second identifier represents each base station which, in the location table stored in the station 2502, has the station 2502 as the last attachment base station (here only station 2504 is concerned), and the first identifier represents each mobile station which is attached to the station identified by the second identifier (here only the station 2505 is concerned).

In this way, if there were three base stations concerned and for each of them there were five mobile stations concerned, the number of messages "report_new_location" would be fifteen.

Finally, during an operation which is not shown, the base station 2500 updates its location table, taking into account the attachments represented by the messages "report_new_location" and taking the station 2500 as the last base station, for the mobile stations which previously had the station 2502 as the last base station.

By virtue of these provisions, the base station 2500 stores a location table which takes into account all the former second subcells of the first subcell whose base station was the station 2502. Each of the second subcells becomes a first subcell of the principal cell whose station 2500 is the base station.

FIG. 29 depicts an algorithm executed by a relay mobile station which sends a relay message to a communication station which is not synchronised with the source of the said message.

In FIG. 29, it can be seen that, first of all, the value of the variable "FP_RELAY" which represents the base station which will serve as a relay, is initialised to the value 2502, during an operation 2900, by the central unit of the station 2501. Then, during an operation 2901, the station 2501 sends, to the station identified by the value of the variable "FP_RELAY", a message "relay_message<CM, 2500>" in which the first term "CM", represents the content of the message intended for the mobile station 2505 and the second term 2500, represents the base station which is the source of the original message (see operation 2705, FIG. 27).

Next, during an operation 2902, the central unit of the station 2501 initialises a timer to a value corresponding to a period T10. Then, during a test 2903, the central unit of the station 2501 determines whether or not a message "relay_message_response" has been received. When the result of test 2903 is positive, during an operation 2904, a message "relay_response" of the type "relay_message_response<CR, 2500, FP_RELAY>", in which the first term "CR" indicates the content of the response, the second term, 2500, represents the station which is the destination of the message "relay_response" and the third term, "FP_RELAY", represents the source station of the message "relay_message_response", is determined. Then an operation 3116, described below, with regard to FIG. 31, is performed.

When the result of test 2903 is negative, during a test 2905, the central unit of the station 2501 determines whether or not a message of the type "report_new_location<2505, 2504>" in which the first term, 2505, represents the message destination station and the second term, 2504, represents the base station with which the destination station is synchronised, has been received.

When the result of test 2905 is positive, an operation 3008 described below with regard to FIG. 30 is performed. When the result of test 2905 is negative, during a test 2906, the central unit of the station 2501 determines whether or not the timer has a nil value. When the result of test 2906 is negative, test 2903 is reiterated. When the result of test 2906 is positive, during an operation 2907, a message "relay_response" of the type "<NONE, 2500, FP_RELAY>" in which the first term, "None", contains the response to the previous message (here there is no response), the second term, 2500, represents the message destination station and the third term, FP_RELAY, represents the station from which a message "relay_message_response" was awaited. Then the operation 3116 described below with regard to FIG. 31 is performed.

In FIG. 30, it can be seen that, following the operation 2905, during an operation 3008, a detachment message "detach" is transmitted by the station 2501 to the station 2502. Then, during an operation 3009, a timer corresponding to a period T11 is initialised. Next, during an operation 3010, the station 2501 searches for a synchronisation signal coming from the base station 2504. During a test 3011, the central unit of the station 2501 determines whether or not this station has succeeded in attaching to the base station 2504. When the result of test 3011 is negative, during a test 3014, the central unit of the station 2501 determines whether or not the timer has a nil value.

When the result of test 3014 is negative, the operation 3010 is reiterated. When the result of test 3014 is positive, the station 2501 sends, to the station 2502, an attachment message "attach", during an operation 3015, before reiterating operation 2907 (FIG. 29).

When the result of test 3011 is positive, during an operation 3012, the station 2501 sends, to the station 2504, an attachment message "attach".

Then, during an operation 3013, the central unit of the station 2501 gives the value 2504 to the variable "FP_RELAY" before reiterating operation 2901 (FIG. 29).

Following one of the operations 2904 or 2907 (FIG. 29), during an operation 3116 (FIG. 31), the mobile station 2501 sends a detachment message "detach". Then, during an operation 3117, the central unit of the station 2501 initialises the value of a timer to the value corresponding to a period T12.

Next, during an operation 3118, the station 2501 searches for a synchronisation signal sent by the base station 2500. Then, during a test 3119, the central unit of the station 2501 determines whether or not the station 2501 has succeeded in attaching to the station 2500. When the result of test 3119 is negative, during a test 3122, the central unit of the station 2501 determines whether or not the value of the timer is nil. When the result of test 3122 is negative, operation 3118 is reiterated. When the result of test 3122 is positive, during an operation 3123, the station 2501 sends an attachment message "attach" to the station identified by "FP_RELAY".

When the result of test 3119 is positive, during an operation 3120, the station 2501 sends, to the station 2500, an attachment message "attach". Then, during an operation 3121, the station 2501 sends, to the station 2500, a message "relay_response".

FIG. 32 depicts the algorithm executed by the base station which has received an information message on a station serving as a relay (see also the operations performed by the station 2502, in FIG. 27).

It can be seen, first of all, that, during a test 3201, the central unit of the base station 2502 determines whether or not a message "relay_message <CM,2500>" (in which the first term, CM, represents the content of the message and the second term, 2500, represents the station which is the source of the message) intended for the station 2505, has been received. When the result of test 3201 is positive, during a test 3202, the central unit of the station 2502 determines whether or not the communication station identifier "2505" is present in the location table stored in the random access memory. When the result of test 3202 is negative, during an operation 3203, the station 2502 sends, to the station 2501, a message "relay_message_response<unknown, 2500, 2502>" in which the first term, "unknown", indicates that the station which is the destination of the message CR to be relayed is unknown, the second term, 2500, represents the station which is the destination of the message "relay_response", and the third term, 2502, represents the source station of the message "relay_message_response". When the result of test 3202 is positive, during a test 3204, the central unit of the station 2502 determines whether or not the station 2505 is situated in the same cell as the station 2502. When the result of test 3204 is negative, the station 2502 sends, to the station 2501, a message "report_new_location<2505, 2504>", during an operation 3206.

When the result of test 3204 is positive, during an operation 3205, the station 2502 sends a message "relay_message<CM, 2500>" to the station 2505.

The invention claimed is:

1. A method of communicating between communication stations adapted to communicate with each other when at least one of the communication stations supplies a synchronisation signal, the station then functioning in base station mode and the stations not supplying a synchronisation signal but synchronising on a synchronisation signal sent by a station functioning in base station mode then functioning in mobile station mode, wherein the method includes:

a first operation of receiving a message, during which a mobile station synchronised with a first base station receives a message coming from the first base station, an operation of detachment and attachment, during which the mobile station synchronises with a second base station, without the two base stations synchronising with each other, and a second transmission operation, during which the mobile station transmits the message to the second base station, and wherein the message represents traffic between the mobile stations synchronised on the first base station and the first base station, and wherein the message destination station is the second base station, and the second base station performs, on receipt of the message, an operation of determining the total traffic during which it determines whether or not the sum:

of the traffic between the mobile stations synchronised on the first base station and the first base station, on the one hand, and the traffic between the mobile stations synchronised on the second base station and the second base station, on the other hand, is less than a predetermined value.

2. The method according to claim 1, wherein when, during the total traffic determination operation, it is determined that the sum:

of the traffic between the mobile stations synchronised on the first base station and the first base station, on the one hand, and the traffic between the mobile stations synchronised on the second base station and the second base station, on the other hand, is less than the predetermined value, one of the base stations performs an operation of switching into mobile station mode and synchronises on the other base station.

3. A method of communicating between communication stations adapted to communicate with each other when at least one of the communication stations supplies a synchronisation signal, the station then functioning in base station mode and the stations not supplying a synchronisation signal but synchronising on a synchronisation signal sent by a station functioning in base station mode then functioning in mobile station mode, wherein the method includes:

a first operation of receiving a message, during which a mobile station synchronised with a first base station receives a message coming from the first base station, an operation of detachment and attachment, during which the mobile station synchronises with a second base station, without the two base stations synchronising with each other, and a second transmission operation, during which the mobile station transmits the message to the second base station, and wherein the message represents traffic between the mobile stations synchronised on the first base station and the first base station, and wherein the message destination station is the second base station, and on reception of the message, the second base station performs a first operation of determining the distribution of traffic between the two base stations during which the second mobile station determines whether or not:

on the one hand, the traffic between the mobile stations synchronised on the first base station and the first base station is less than a predetermined value, and on the other hand, the traffic between the mobile stations synchronised on the second base station and the second base station is greater than a predetermined value.

4. The method according to claim 3, wherein when, during the first traffic distribution determination operation, it is determined that:

the traffic between the mobile stations synchronised on the first base station and the first base station is less than a predetermined value, on the one hand, and the traffic between the mobile stations synchronised on the second base station and the second base station is greater than a predetermined value, on the other hand, the second base station performs an operation of seeking a communication to be transferred during which the second mobile station determines whether at least one of the communications between mobile stations which are synchronised with the second base station can be transferred to the first base station.

* * * * *